US011926166B2

(12) United States Patent
Hanaoka et al.

(10) Patent No.: US 11,926,166 B2
(45) Date of Patent: Mar. 12, 2024

(54) LIQUID EJECTING APPARATUS AND SUB-CARRIAGE

(71) Applicant: Seiko Epson Corporation, Tokyo (JP)

(72) Inventors: Yukihiro Hanaoka, Shiojiri (JP); Takao Yamamoto, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 4 days.

(21) Appl. No.: 17/739,233

(22) Filed: May 9, 2022

(65) Prior Publication Data

US 2022/0355600 A1 Nov. 10, 2022

(30) Foreign Application Priority Data

May 10, 2021 (JP) ................................ 2021-079543

(51) Int. Cl.
*B41J 29/377* (2006.01)
*B41J 2/14* (2006.01)

(52) U.S. Cl.
CPC ......... *B41J 29/377* (2013.01); *B41J 2/14201* (2013.01)

(58) Field of Classification Search
CPC ........ B41J 29/377; B41J 2/14201; B41J 2/18; B41J 2002/14419; B41J 2/14233; B41J 2002/14362; B41J 2002/14491; B41J 2202/12; B41J 2202/19; B41J 2202/20; B41J 2/01
See application file for complete search history.

(56) References Cited

U.S. PATENT DOCUMENTS

2012/0038708 A1 2/2012 Ishii et al.
2020/0384765 A1 12/2020 Mizuno

FOREIGN PATENT DOCUMENTS

JP 2012-040695 A 3/2012
JP 2020-199638 A 12/2020

OTHER PUBLICATIONS

Machine Translation of “Inkjet Head, Head Module, and Inkjet Recording Device” (WO 2017/183389) to Watanabe, Paragraphs “Outline of Inkjet recording apparatus”, “Head module”, and Inkjet head. (Year: 2017).*

* cited by examiner

*Primary Examiner* — Lisa Solomon
(74) *Attorney, Agent, or Firm* — Harness, Dickey & Pierce, P.L.C.

(57) ABSTRACT

A liquid ejecting apparatus includes a first liquid ejecting head configured to eject a liquid to an ejection direction, a sub-carriage that holds the first liquid ejecting head, and a carriage that holds the sub-carriage. The sub-carriage includes: a first member that is thermally conductive and holds the first liquid ejecting head; and a heating section provided in the first member. The first liquid ejecting head includes a first side wall facing the first member. The first member is located between the heating section and the first side wall when viewed in the ejection direction.

20 Claims, 15 Drawing Sheets

LIQUID EJECTING APPARATUS AND SUB-CARRIAGE

The present application is based on, and claims priority from JP Application Serial No. 2021-079543, filed May 10, 2021, the disclosure of which is hereby incorporated by reference herein in its entirety.

BACKGROUND

1. Technical Field

The present disclosure relates to a liquid ejecting apparatus and a sub-carriage.

2. Related Art

There is known a liquid ejecting apparatus that includes: a liquid ejecting head having a supply path member; and a heater for heating ink in the liquid ejecting head. JP-A-2020-199638 discloses a liquid ejecting head in which a heater for heating ink is arranged on a side surface of a supply path member.

Since the heater described in JP-A-2020-199638 is directly fixed to the side surface of the liquid ejecting head, the distance from the heater to a channel in the liquid ejecting head is short. Thus, since it is difficult for heat from the heater to transfer in the in-plane direction of the side surface of the liquid ejecting head to which the heater is fixed, the temperature in the liquid ejecting head readily varies. In this scenario, the liquid ejecting head to which the heater is directly fixed may cause a variation in temperature of the liquid ejecting head.

SUMMARY

A liquid ejecting apparatus according to an aspect of the disclosure includes a first liquid ejecting head that ejects a liquid, a sub-carriage that holds the first liquid ejecting head, and a carriage that holds the sub-carriage. The sub-carriage includes: a first member that is thermally conductive and holds the first liquid ejecting head; and a heating section provided in the first member. The first liquid ejecting head includes a first side wall facing the first member. The heating section is arranged so as to hold the first member against the first side wall when viewed in an ejection direction of the liquid ejected from the first liquid ejecting head.

A sub-carriage according to an aspect of the disclosure holds a head for ejecting a liquid and is held by a carriage of a liquid ejecting apparatus, and the sub-carriage includes: a frame body that is thermally conductive and encloses a side wall of the head when viewed in an ejection direction of the liquid ejected from the head; and a heating section provided on an outer peripheral surface of the frame body.

DESCRIPTION OF EXEMPLARY EMBODIMENTS

Figure 1:
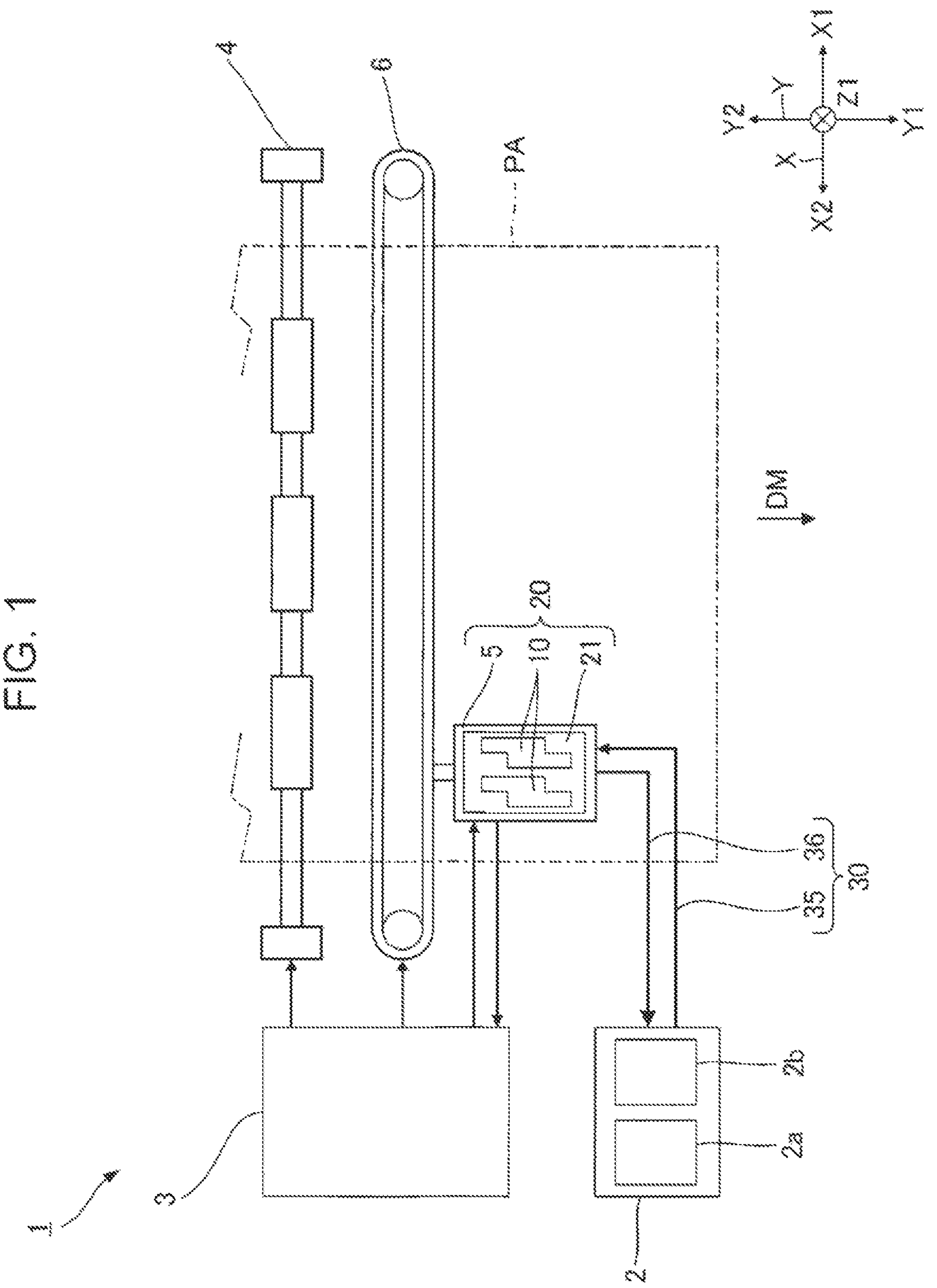
FIG. 1 is a schematic view illustrating a liquid ejecting apparatus according to an embodiment.

An embodiment of the disclosure will be described below with reference to the drawings. Note that, dimensions and scales of sections in the drawings differ appropriately from actual ones. Since the embodiment described below is a preferred specific example of the disclosure, various limitations desirable from a technical viewpoint are added. However, the scope of the disclosure is not limited to the embodiment as long as there is no description particularly limiting the disclosure in the following description.

The following description may be given by assuming that three directions orthogonal to each other are the X-axis direction, the Y-axis direction, and the Z-axis direction. The X-axis direction includes the X1 direction and the X2 direction opposite to each other. The Y-axis direction includes the Y1 direction and the Y2 direction opposite to each other. The Z-axis direction includes the Z1 direction and the Z2 direction opposite to each other. The Z1 direction is a downward direction, and the Z2 direction is an upward direction. The Z1 direction is an example of an ejection direction. The Y-axis direction is an example of a first direction. The X-axis direction is an example of a second direction. In the present specification, “up” and “down” are used. “Up” and “down” correspond to “up” and “down” in a typical use state of a liquid ejecting apparatus 1 in which nozzles are oriented in the down direction.

The X-axis direction, the Y-axis direction, and the Z-axis direction are orthogonal to each other. The Z-axis direction typically extends in the up-down direction but does not necessarily extend in the up-down direction.

FIG. 1 is a schematic view illustrating the liquid ejecting apparatus 1 according to an embodiment. The liquid ejecting apparatus 1 is an ink jet printing apparatus that ejects ink, which is an example of “a liquid”, in the form of liquid droplets onto a medium PA. The liquid ejecting apparatus 1 is a printing apparatus of a serial type. The liquid ejecting apparatus 1 includes a plurality of liquid ejecting heads 10. A liquid ejecting head 10 ejects the ink onto the medium PA while moving in a width direction of the medium PA. The medium PA is typically a printing sheet. Note that the medium PA is not limited to a printing sheet and may be any printing object made from resin film, fabric, or the like.

As illustrated in FIG. 1, the liquid ejecting apparatus 1 includes a liquid container 2 in which ink is stored. Examples of a specific aspect of the liquid container 2 include a cartridge detachably attached to the liquid ejecting apparatus 1, a bag-like ink pack formed from a flexible film, and an ink tank that is able to be replenished with ink. Note that any type of ink may be stored in the liquid container 2. The liquid container 2 is an example of a liquid storage section.

The liquid container 2 includes a first liquid container 2*a* and a second liquid container 2*b*. A first ink is stored in the first liquid container 2*a*. A second ink that differs from the first ink in type is stored in the second liquid container 2*b*. For example, the first ink and the second ink differ from each other in color. Note that the first ink and the second ink may be the same type. Note that a composition of the ink is not particularly limited, and an aqueous ink in which a coloring material, such as dye or pigment, is dissolved in an aqueous solvent, a solvent-based ink in which a coloring material is dissolved in an organic solvent, or a UV curable ink, for example, may be used. The ink may be a resin-based solvent ink. The liquid ejecting apparatus 1 is able to use liquid having high viscosity at a normal temperature.

The liquid ejecting apparatus 1 includes a control unit 3, a medium-transport mechanism 4, a carriage 5, and a carriage transport mechanism 6. The control unit 3 controls operations of the respective elements of the liquid ejecting apparatus 1. The control unit 3 includes, for example, a processing circuit, such as a central processing unit (CPU) or a field programmable gate array (FPGA), and a storage circuit, such as semiconductor memory. Various programs and various kinds of data are stored in the storage circuit. The processing circuit realizes various kinds of control by executing a program and using the data as appropriate.

The medium-transport mechanism 4 transports the medium PA in a transport direction DM in accordance with control performed by the control unit 3. The medium-transport mechanism 4 includes a transport roller for transporting the medium PA and a motor for rotating the transport roller. Note that the medium-transport mechanism 4 is not limited to being configured to use the transport roller and may be configured to use, for example, a drum or an endless belt for transporting the medium PA while causing the medium PA to cling to the outer circumferential surface through an electrostatic force or the like.

The carriage transport mechanism 6 causes a head unit 20 to be reciprocated in the X-axis direction in accordance with control performed by the control unit 3. The carriage transport mechanism 6 may include, for example, an endless belt wound around a plurality of rollers separate from each other in the X-axis direction. Note that the liquid container 2 may be configured to be mounted on the carriage 5 to be transported together with the plurality of liquid ejecting heads 10.

Figure 2:
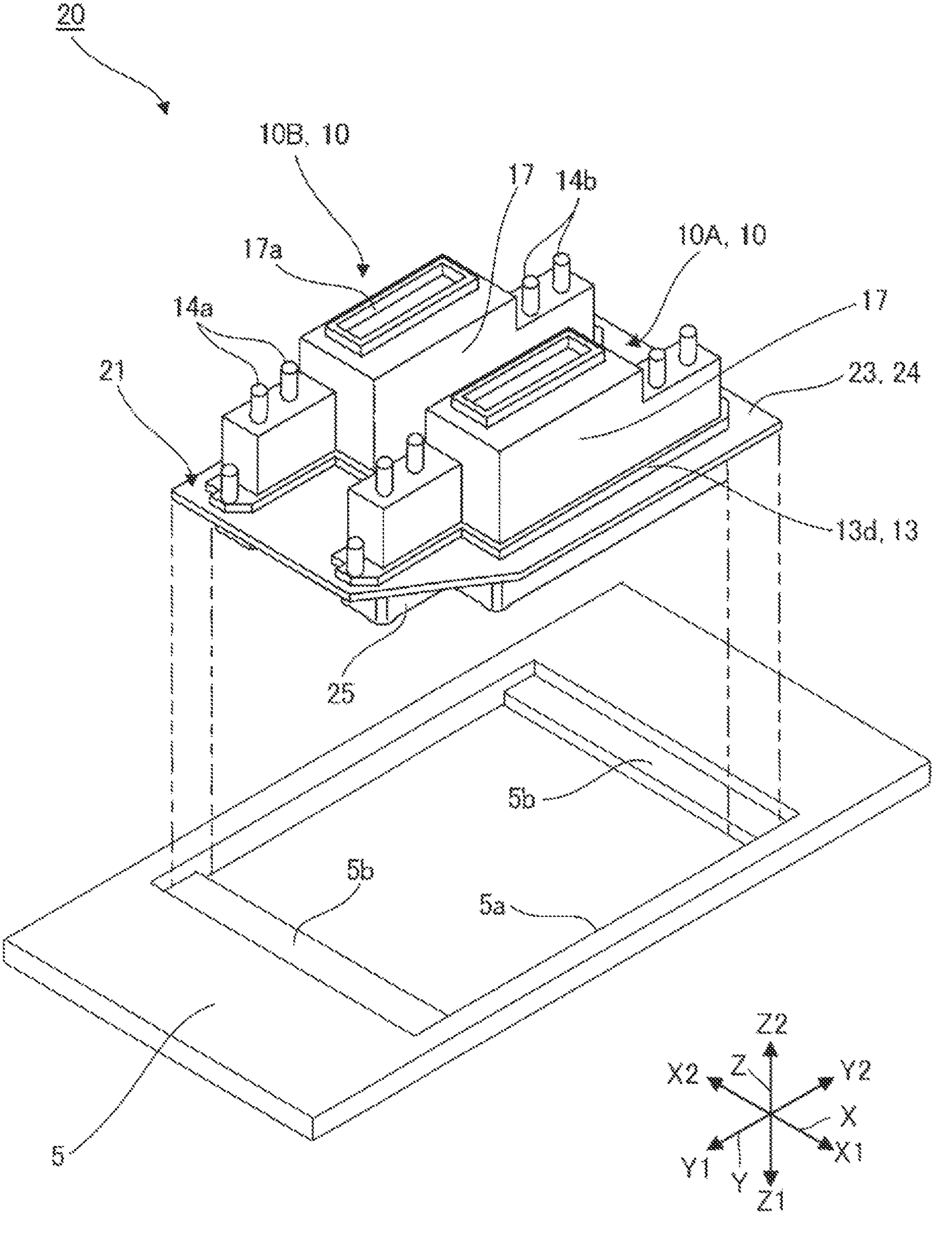
FIG. 2 is an exploded perspective view illustrating a head unit.
Figure 3:
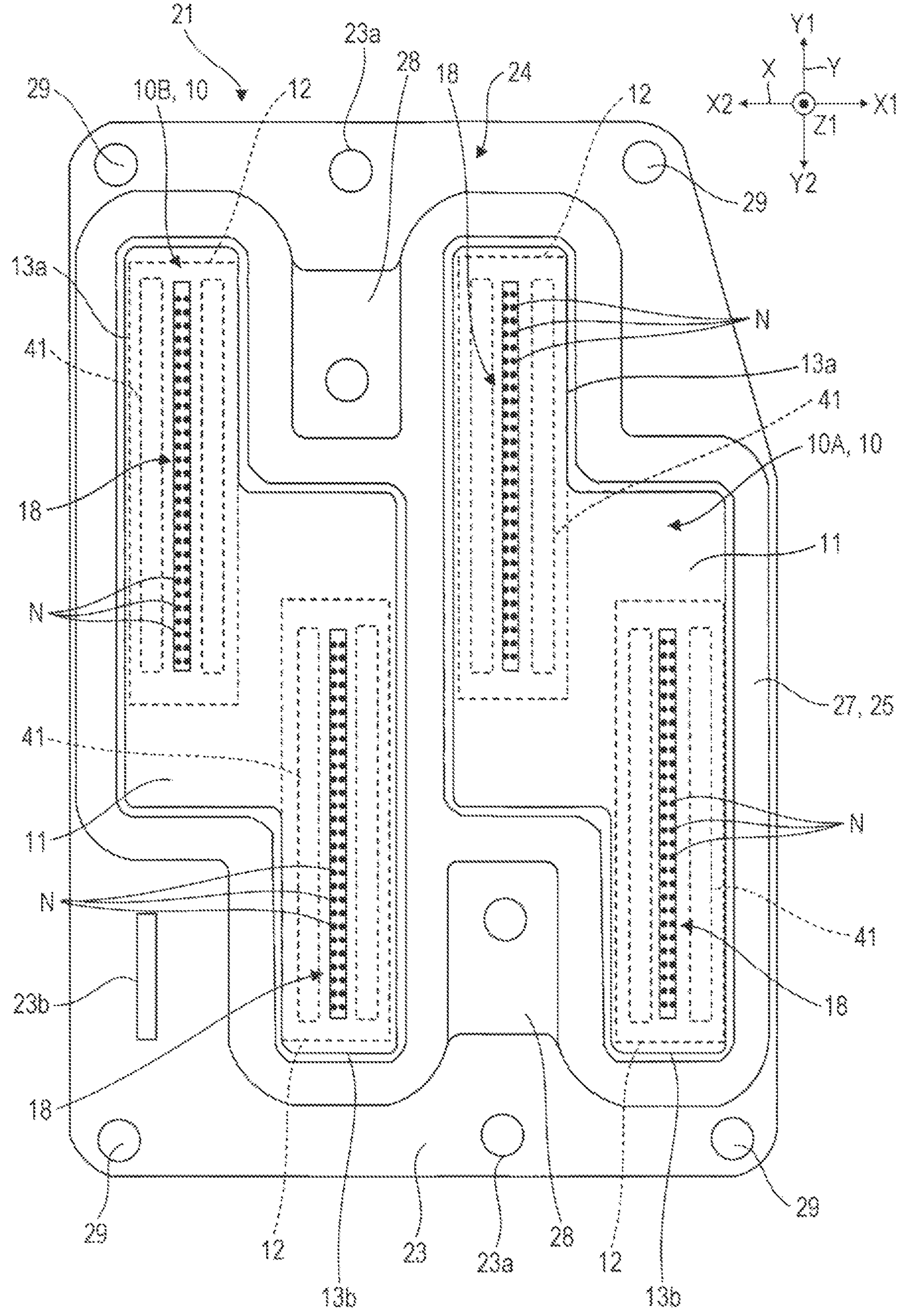
FIG. 3 is a bottom view illustrating a liquid ejecting head held by a sub-carriage.
Figure 4:
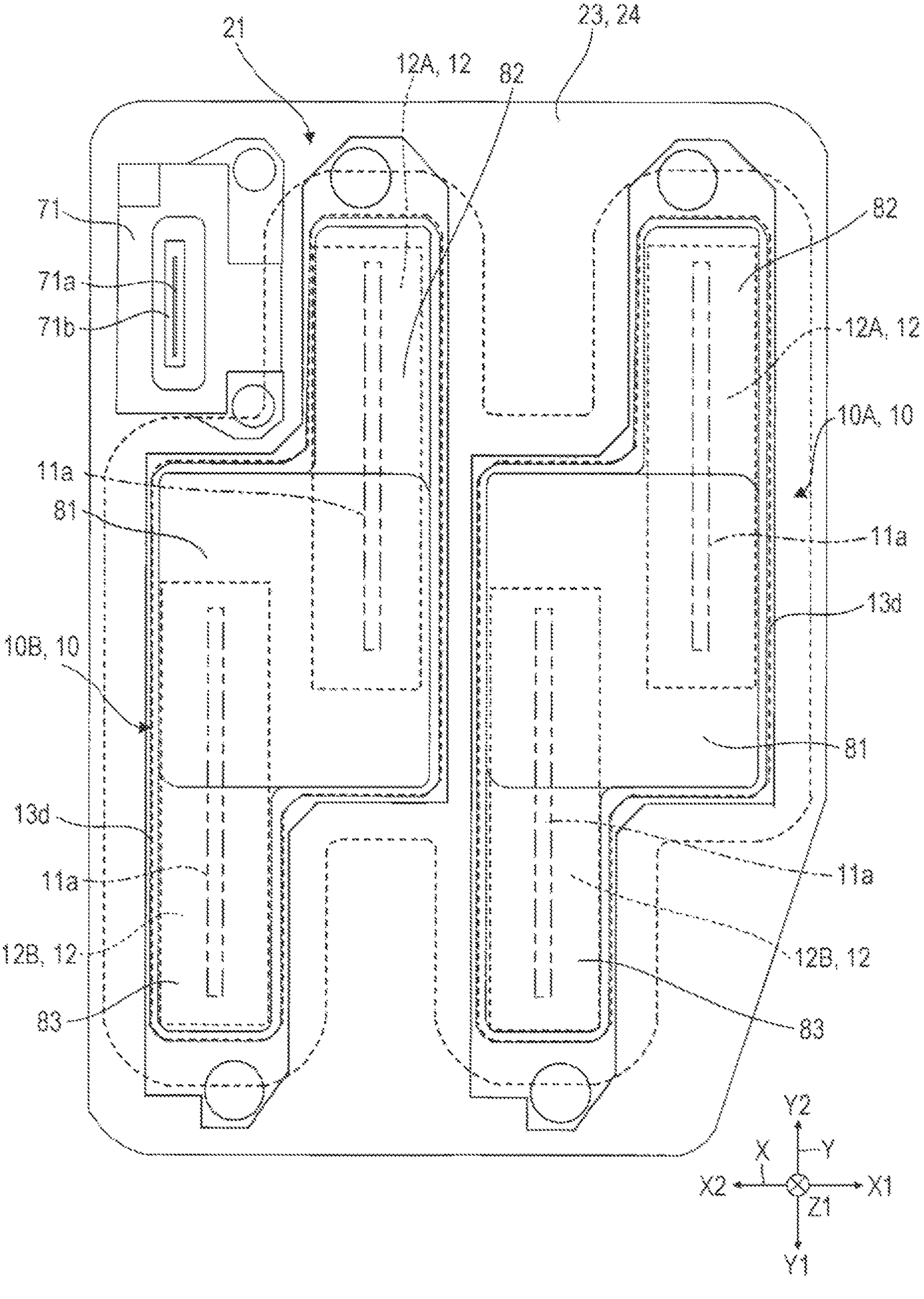
FIG. 4 is a plan view illustrating the liquid ejecting head held by the sub-carriage.
Figure 5:
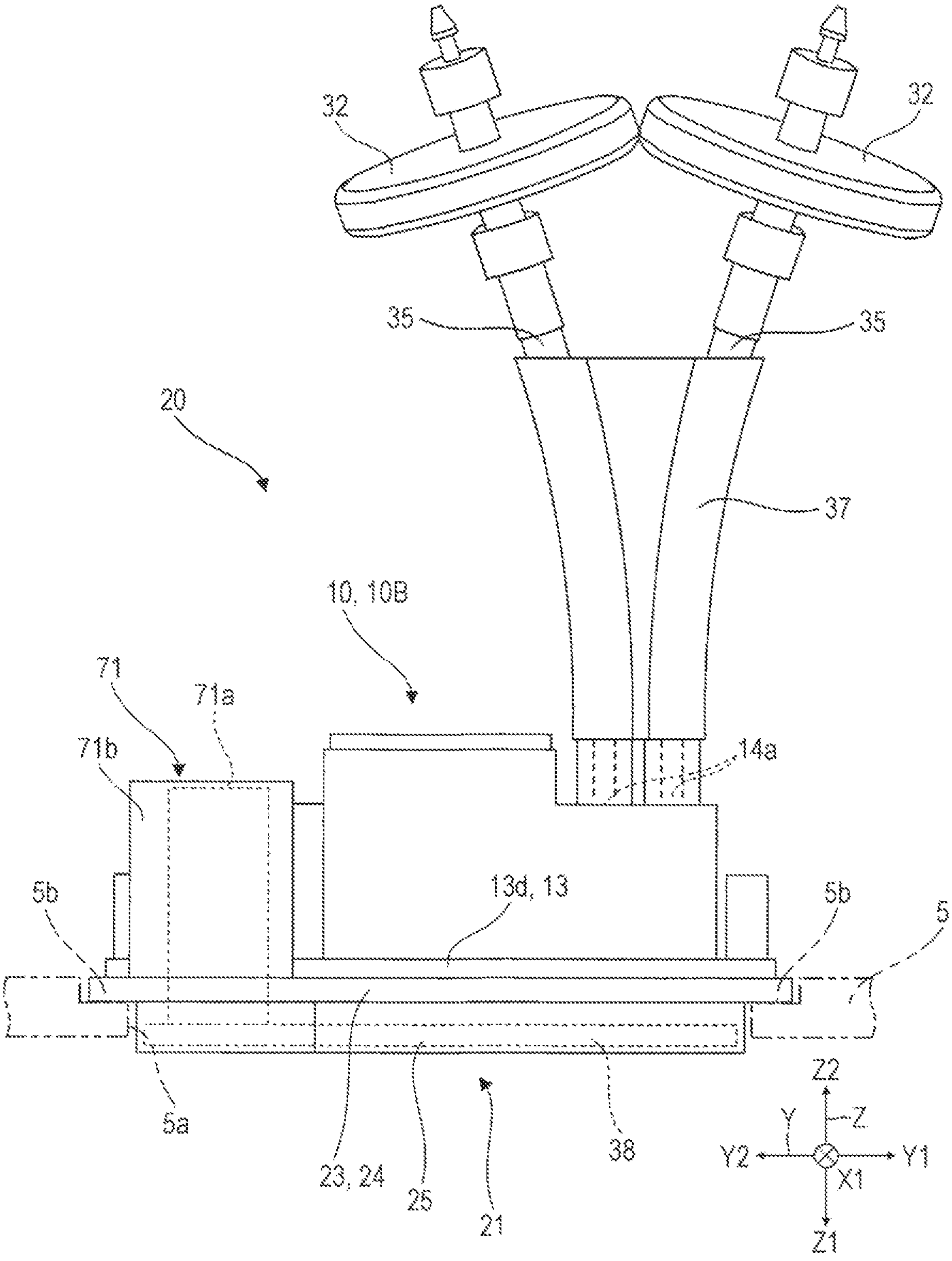
FIG. 5 is a side view illustrating the liquid ejecting head held by the sub-carriage.

FIG. 2 is an exploded perspective view illustrating the head unit 20. FIG. 3 is a bottom view illustrating the liquid ejecting head 10 and a sub-carriage 21. FIG. 4 is a plan view illustrating the liquid ejecting head 10 and the sub-carriage 21. FIG. 5 is a side view illustrating the liquid ejecting head 10 and the sub-carriage 21. The liquid ejecting apparatus 1 includes the head unit 20. The head unit 20 includes the liquid ejecting head 10, the sub-carriage 21, and the carriage 5. The sub-carriage 21 holds the plurality of liquid ejecting heads 10. The carriage 5 holds the sub-carriage 21.

Figure 6:
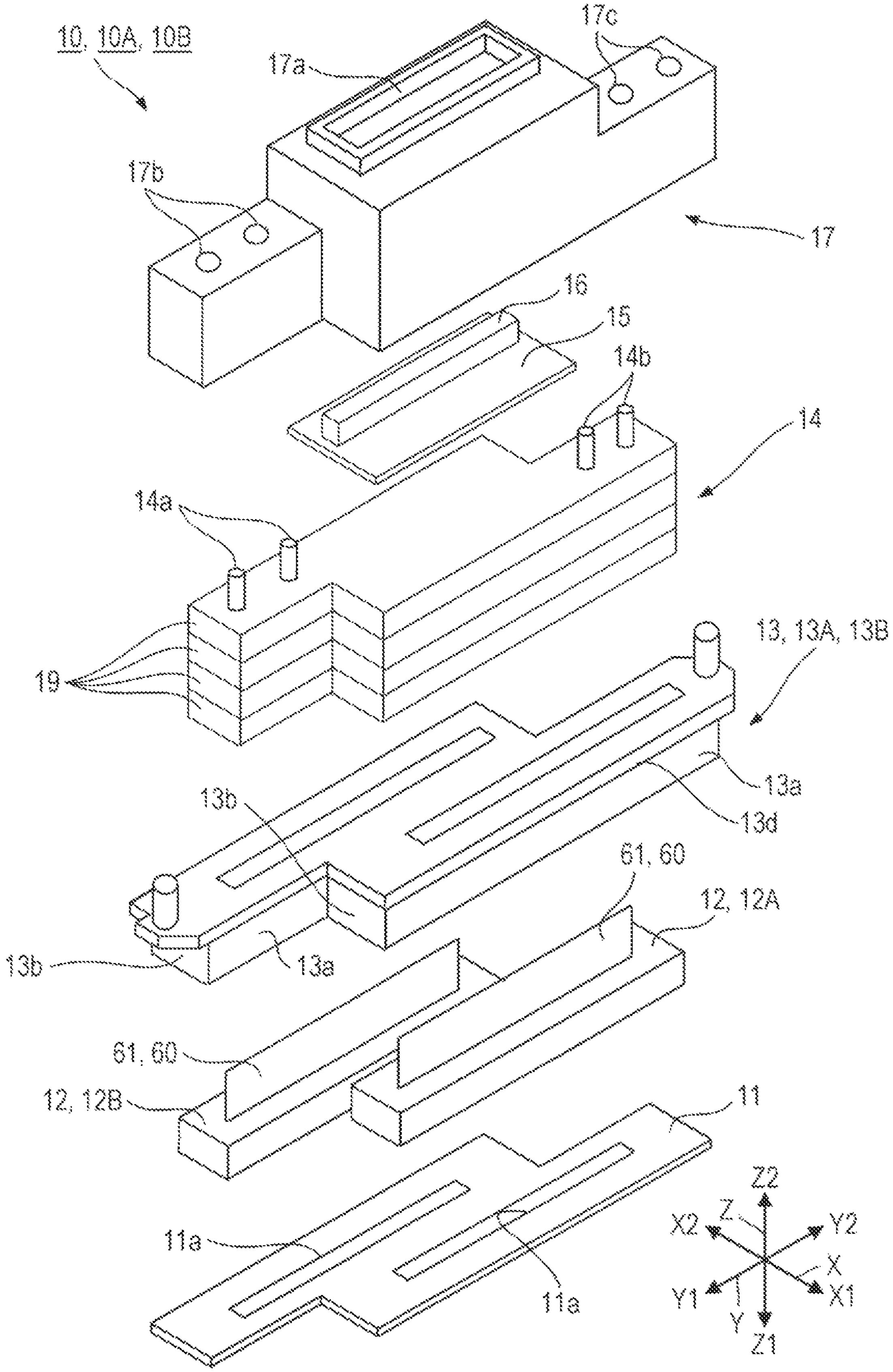
FIG. 6 is an exploded perspective view illustrating the liquid ejecting head.

FIG. 6 is an exploded perspective view illustrating the liquid ejecting head 10. As illustrated in FIG. 6, the liquid ejecting head 10 includes a fixing plate 11, a plurality of head chips 12 each provided with nozzles N, a holder 13 that holds the fixing plate 11 and the head chips 12, a channel structure 14 for forming an ink channel, a relay substrate 15 arranged on the channel structure 14, a connector 16 provided in the relay substrate 15, and an upper cover 17.

Figure 8:
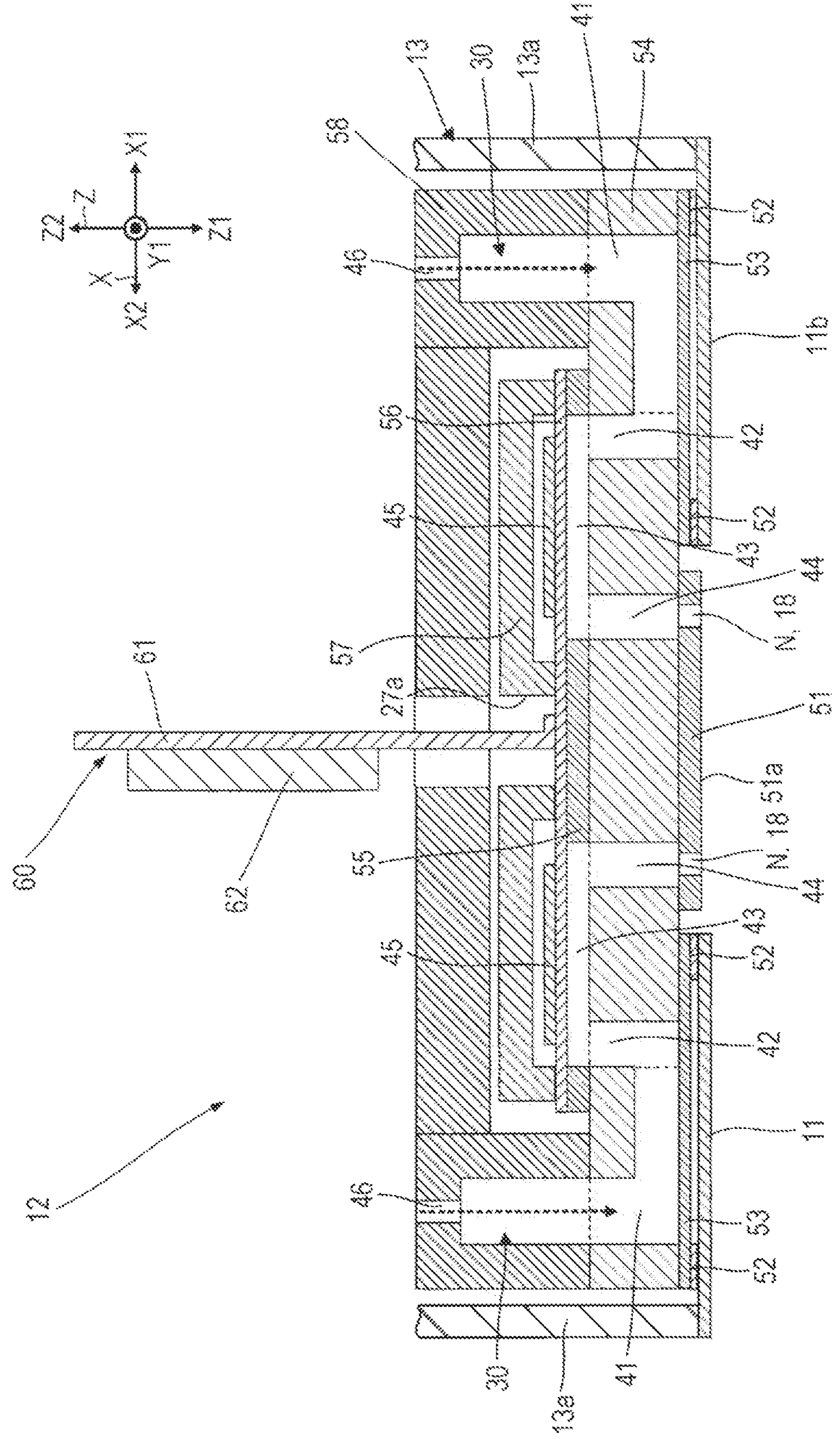
FIG. 8 is a sectional view illustrating a head chip.

A bottom surface of the liquid ejecting head 10 is constituted by the fixing plate 11. An opening 11*a* for exposing nozzles N of a head chip 12 is formed in the fixing plate 11. The nozzles N are illustrated in FIGS. 3 and 8.

As illustrated in FIGS. 3 and 6, the plurality of head chips 12 are arranged at the bottom of the liquid ejecting head 10. The plurality of head chips 12 are held by the holder 13. A plurality of nozzles N for ejecting liquid are provided in the head chip 12. The nozzles N illustrated in FIG. 3 are arrayed in the Y-axis direction to form a nozzle row 18.

As illustrated in FIG. 6, the channel structure 14 is arranged on the holder 13. A channel in which ink flows is formed in the channel structure 14. The channel structure 14 includes a plurality of channel substrates 19. The plurality of channel substrates 19 are layered in a thickness direction thereof. For example, a groove and an opening are formed in a channel substrate 19. The channel is formed by the groove and the opening.

The channel structure 14 includes an ink supply port 14*a* for introducing ink into the channel structure 14 and an ink discharge port 14*b* for discharging ink from the channel structure 14. Thus, the liquid ejecting apparatus 1 is able to adopt an ink circulating system in which ink is circulated but does not necessarily adopt an ink circulating system by using only the ink supply port 14*a* and not the ink discharge port 14*b*.

The relay substrate 15 covers an upper portion of a center portion of the channel structure 14 in the Y-axis direction. A plurality of electric wires are provided in the relay substrate 15. The head chip 12 is electrically coupled to the electric wires provided in the relay substrate 15.

The connector 16 protrudes upward from the relay substrate 15. The connector 16 is electrically coupled to an electric component outside the liquid ejecting head 10. The head chip 12 is electrically coupled to the control unit 3 via the connector 16.

The plurality of liquid ejecting heads 10 include a liquid ejecting head 10A and a liquid ejecting head 10B. The liquid ejecting heads 10A and 10B are arranged so as to be adjacent to each other in the X-axis direction. The liquid ejecting head 10A is an example of a first liquid ejecting head, and the liquid ejecting head 10B is an example of a second liquid ejecting head. The first liquid ejecting head may be the liquid ejecting head 10B, and the second liquid ejecting head may be the liquid ejecting head 10A.

As illustrated in FIG. 4, the liquid ejecting heads 10A and 10B each include a plurality of head chips 12. The plurality of head chips 12 include a head chip 12A and a head chip 12B. The head chip 12A and the head chip 12B are adjacent to each other. The head chips 12A and 12B are elongated in the Y-axis direction and arranged to be shifted in the X-axis direction and the Y-axis direction, which intersects the X-axis direction. The head chip 12A is arranged to be shifted from the head chip 12B in the X1 direction and the Y2 direction.

As illustrated in FIG. 6, the Z1 direction end of the upper cover 17 comes into contact with the Z2 direction surface of the holder 13 so as to accommodate the channel structure 14, the relay substrate 15, and the connector 16 against the Z2 direction surface of the holder 13. A wire opening 17*a* through which an external wiring member is inserted into the connector 16 and openings 17*b* and 17*c* through which the ink supply port 14*a* and the ink discharge port 14*b* are coupled to an external channel member, such as a tube, are provided on the Z2 direction upper surface of the upper cover 17.

As illustrated in FIG. 4, the exterior of the liquid ejecting head 10 in plan view in the ejection direction includes a center portion 81 and protrusions 82 and 83. The protrusion 82 protrudes in the Y2 direction from the center portion 81 when viewed in the Z-axis direction. The protrusion 83 protrudes in the Y1 direction from the center portion 81 when viewed in the Z-axis direction. The protrusion 82 overlaps the Y2 direction end of the head chip 12A when viewed in the Z-axis direction. The protrusion 83 overlaps the Y1 direction end of the head chip 12B when viewed in the Z-axis direction. The center portion 81 includes the Y1 direction end of the head chip 12A and the Y2 direction end of the head chip 12B. The center portion 81 includes at least a portion of the head chip 12A and at least a portion of the head chip 12B. The dimension of each of the protrusions 82 and 83 in the X-axis direction is equal to or less than a half of the dimension of the center portion 81 in the X-axis direction. The protrusion 82 is located in the X1 direction with respect to a center line that extends in the Y-axis direction by passing through the center of the center portion 81, and the protrusion 83 is located in the X2 direction with respect to the center line. The exterior of the liquid ejecting head 10 may be, for example, the holder 13.

Figure 7:
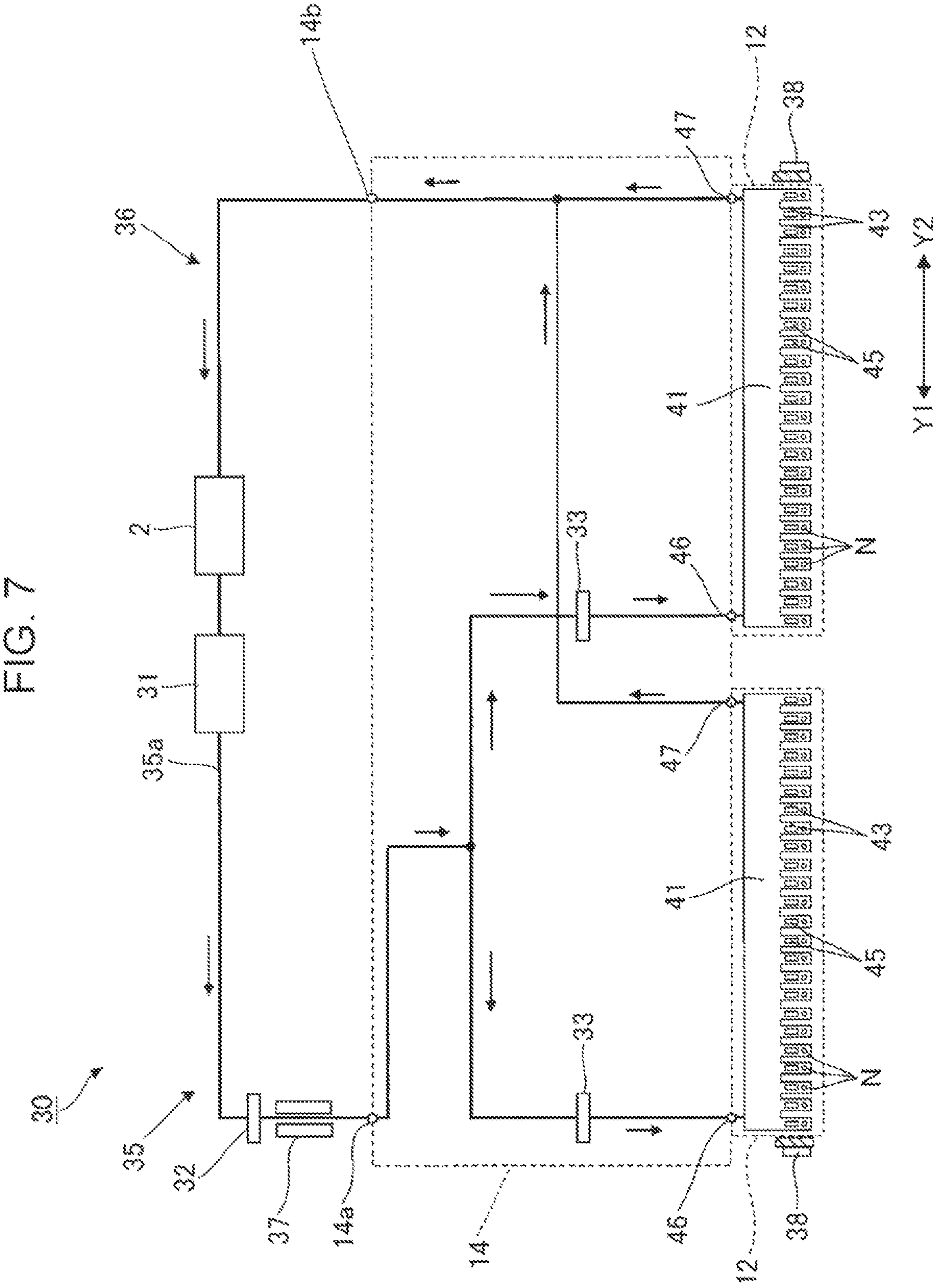
FIG. 7 is a schematic view illustrating a channel for ink of the liquid ejecting apparatus.

FIG. 7 is a schematic view illustrating a channel 30 for ink of the liquid ejecting apparatus 1. FIG. 7 illustrates the channel 30 in which a single type of ink flows and also illustrates a flow of the ink in the channel 30 when an ink circulating system is adopted. The channel 30 for ink is provided for each type of ink. The liquid container 2, a pump 31, filters 32 and 33, and a common liquid chamber 41 are coupled to the channel 30. The channel 30 includes a supply channel 35 and a collection channel 36. The supply channel 35 is a channel for supplying the ink from the liquid container 2 to the common liquid chamber 41. The collection channel 36 is a channel for collecting the ink from the common liquid chamber 41 to the liquid container 2. The liquid ejecting apparatus 1 includes heaters 37 and 38 for heating the ink. The heater 37 heats the ink flowing in the supply channel 35. The heater 38 is provided in the subcarriage 21 and heats the ink in the head chip 12. Details of the heater 38 will be described later with reference to FIGS. 11 to 15.

The pump 31 is coupled to a portion downstream of the liquid container 2 and transfers the ink stored in the liquid container 2. The heater 37 is coupled to a portion downstream of the pump 31 and heats the ink to a predetermined temperature. Note that the heater 37 may be configured to heat the ink stored in the liquid container 2. It is possible to adjust ink viscosity by controlling ink temperature. The liquid container 2, the pump 31, and the heater 37 are arranged outside the liquid ejecting head 10. The liquid container 2, the pump 31, and the heater 37 may be mounted on, for example, the carriage 5. As illustrated in FIG. 5, the heater 37 is arranged in the Z2 direction with respect to the liquid ejecting head 10. The filter 32 is arranged in the Z2 direction with respect to the heater 37. The filter 32 removes foreign substances and air bubbles mixed in the ink.

As illustrated in FIG. 7, the ink flows in the supply channel 35 and is introduced to the channel in the channel structure 14 through the ink supply port 14*a*. The channel in the channel structure 14 branches into a plurality of channels so as to be coupled to the plurality of head chips 12. The head chip 12 includes the common liquid chamber 41. The ink introduced to the head chip 12 is stored in the common liquid chamber 41. Some ink stored in the common liquid chamber 41 is ejected from the nozzles N.

The filter 33 is provided upstream of the common liquid chamber 41 in the channel in the channel structure 14. The ink that has passed through the filter 33 is supplied to the common liquid chamber 41. The filter 33 removes foreign substances and air bubbles mixed in the ink.

Ink which is stored in the common liquid chamber 41 and is not ejected from the nozzles N is collected in the liquid container 2. The ink discharged from the common liquid chamber 41 flows in the channel in the channel structure 14 and is discharged to outside of the channel structure 14 through the ink discharge port 14*b*. The ink discharged through the ink discharge port 14*b* flows in the collection channel 36 and is collected in the liquid container 2. The ink is circulated in this manner.

FIG. 8 is a sectional view illustrating the head chip 12. As illustrated in FIG. 8, the head chip 12 includes the common liquid chamber 41, a relay channel 42, a pressure chamber 43, a communication channel 44, a piezoelectric actuator 45, and a nozzle N. The head chip 12 also includes a nozzle plate 51, a compliance substrate 53, a communication plate 54, a pressure chamber forming plate 55, a vibrating plate 56, a protection substrate 57, and a case 58.

The nozzle plate 51 extends in the Y-axis direction and has a predetermined dimension. The plurality of nozzles N are formed in the nozzle plate 51. A nozzle N is a hole passing through the nozzle plate 51 in a thickness direction. The plurality of nozzles N are arrayed in the Y-axis direction to form the nozzle row 18. A plurality of nozzle rows 18 are separate from each other in the X-axis direction.

A portion of the common liquid chamber 41, the relay channel 42, and the communication channel 44 are formed in the communication plate 54. A portion of the common liquid chamber 41 in the Z1 direction is formed in the communication plate 54. The communication channel 44 communicates with the nozzle N. A plurality of communication channels 44 communicate with a plurality of corresponding nozzles N. The nozzle plate 51 is arranged in the Z1 direction with respect to the communication plate 54. The nozzles N are arranged in the Z1 direction with respect to the respective communication channels 44. The communication plate 54 is formed of silicon or metal, such as stainless steel.

The compliance substrate 53 is arranged in the Z1 direction with respect to the communication plate 54. The compliance substrate 53 is formed so as to cover the relay channel 42 and the common liquid chamber 41. The compliance substrate 53 is supported by the fixing plate 11 via a support plate 52. The support plate 52 is formed so as to enclose the common liquid chamber 41 and the relay channel 42 when viewed in the Z-axis direction. The support plate 52 is formed of metal, such as stainless steel. In the Z-axis direction, a gap is formed between the common liquid chamber 41 and the fixing plate 11 and between the relay channel 42 and the fixing plate 11. The compliance substrate 53 is formed of a flexible member, such as a resin film or a thin metal plate, and deforms in the Z1 direction and the Z2 direction so as to be proximal to and separate from the fixing plate 11 to reduce a pressure change of the ink in the common liquid chamber 41. Note that, even when formed of resin, the compliance substrate 53 has considerably low heat resistance as long as the compliance substrate 53 is a thin film, thus hardly hindering thermal conduction.

The pressure chamber forming plate 55 is arranged in the Z2 direction with respect to the communication plate 54. A plurality of pressure chambers 43 are formed in the pressure chamber forming plate 55. The plurality of pressure chambers 43 are formed to correspond to the plurality of nozzles N. The pressure chamber 43 communicates with the relay channel 42 and the communication channel 44.

The vibrating plate 56 is arranged in the Z2 direction with respect to the pressure chamber forming plate 55. A wall surface of the pressure chamber 43 in the Z2 direction is constituted by the vibrating plate 56. A plurality of piezoelectric actuators 45 are arranged on the Z2 direction surface of the vibrating plate 56. The plurality of piezoelectric actuators 45 are provided to correspond to the plurality of pressure chambers 43. The piezoelectric actuator 45 includes a plurality of electrodes and a piezoelectric layer arranged between the electrodes.

The protection substrate 57 is arranged in the Z2 direction with respect to the vibrating plate 56. The protection substrate 57 covers the plurality of piezoelectric actuators 45. The protection substrate 57 reinforces the vibrating plate 56 and protects the plurality of piezoelectric actuators 45.

A portion of the common liquid chamber 41 is formed in the case 58. A portion of the common liquid chamber 41 in the Z2 direction is formed in the case 58, and a portion of the common liquid chamber 41 in the Z1 direction is formed in the communication plate 54. A supply port 46 and a discharge port 47 are formed in the case 58. The supply port 46 and the discharge port 47 are separate from each other in the Y-axis direction. The discharge port 47 is illustrated in FIG. 7.

As illustrated in FIG. 8, the ink flows into the common liquid chamber 41 through the supply port 46. The ink in the common liquid chamber 41 flows into the pressure chamber 43 through the relay channel 42. The ink in the pressure chamber 43 is ejected from the nozzle N through the communication channel 44.

The head chip 12 includes a COF 60. "COF" is an abbreviation for chip on film. The COF 60 includes a flexible wiring substrate 61 and a drive circuit 62. The flexible wiring substrate 61 is a wiring substrate having flexibility. The flexible wiring substrate 61 is, for example, an FPC. The flexible wiring substrate 61 may be, for example, an FFC. "FPC" is an abbreviation for flexible printed circuit. "FFC" is an abbreviation for flexible flat cable.

The piezoelectric actuator 45 is electrically coupled to the flexible wiring substrate 61 via a lead electrode (not illustrated). The drive circuit 62 is electrically coupled to the flexible wiring substrate 61. The flexible wiring substrate 61 is electrically coupled to the control unit 3 illustrated in FIG. 1.

The piezoelectric actuator 45 is electrically coupled to the control unit 3. The piezoelectric actuator 45 is driven in accordance with control performed by the control unit 3. The piezoelectric actuator 45 deforms a wall surface of the pressure chamber 43 to change the capacity of the pressure chamber 43. The piezoelectric actuator 45 thereby ejects the ink in the pressure chamber 43 from the nozzle N. Note that the liquid ejecting head 10 may be configured to include another drive element, such as a heat-generating element, instead of the piezoelectric actuator 45.

As illustrated in FIGS. 6 and 8, the holder 13 includes side walls 13*a* and 13*b* arranged so as to cover a side surface of the head chip 12. The side walls 13*a* and 13*b* are examples of a first side wall. The side wall 13*a* has a thickness direction extending in the X-axis direction. The side wall 13*b* has a thickness direction extending in the Y-axis direction. As illustrated in FIG. 8, the side wall 13*a* is arranged outside the head chip 12 in the X-axis direction. The fixing plate 11 is attached to the side walls 13*a* and 13*b* of the holder 13. As illustrated in FIG. 3, the side walls 13*a* and 13*b* are arranged so as to enclose the head chip 12 when viewed in the Z-axis direction.

The side walls 13*a* and 13*b* may be formed of, for example, metal. The side walls 13*a* and 13*b* may be formed of, for example, stainless steel or titanium. The side walls 13*a* and 13*b* may be formed of thermally conductive ceramic. The side walls 13*a* and 13*b* may be formed of another thermally conductive material. Since the side walls 13*a* and 13*b* are components of the liquid ejecting head 10, to which ink may be attached, the side walls 13*a* and 13*b* are desirably formed of stainless steel, titanium, ceramic, or the like from the viewpoint of a liquid resistance. Note that a portion of a channel in which ink flows may be formed in the side walls 13*a* and 13*b*. In this instance, it is particularly desirable that the side walls 13*a* and 13*b* be formed of stainless steel, titanium, ceramic, or the like from the viewpoint of a liquid resistance. Note that "thermally conductive" may denote, for example, a state in which thermal conductivity is equal to or more than 10.0 W/m·K at a normal temperature. A normal temperature is, for example, from 15° C. to 25° C.

As illustrated in FIG. 2, the holder 13 includes a flange 13*d*. The flange 13*d* protrudes further outward than the side walls 13*a* and 13*b* when viewed in the Z-axis direction. The flange 13*d* is arranged so as to overlap the sub-carriage 21 when viewed in the Z-axis direction. The flange 13*d* is formed to be integrated with the side walls 13*a* and 13*b*. The flange 13*d* may be configured to be separate from the side walls 13*a* and 13*b*. The side walls 13*a* and 13*b* and the flange 13*d* may be formed of the same material or different materials. As described later, the side walls 13*a* and 13*b*, the flange 13*d*, and the sub-carriage 21 are able to transfer heat to each other. Note that the holder 13 may be formed of non-thermally conductive resin.

As illustrated in FIGS. 2 and 5, the liquid ejecting head 10 is held by the sub-carriage 21 and mounted on the carriage 5. The carriage 5 may be a supporting body that supports the sub-carriage 21. The carriage 5 has, for example, a plate shape. An opening 5*a* for exposing the sub-carriage 21 is formed in the carriage 5. A sub-carriage supporting section 5*b* is formed on each side of the opening 5*a* in the Y-axis direction. The sub-carriage supporting section 5*b* may be, for example, a stepped surface. The carriage 5 is formed of, for example, metal. The carriage 5 is desirably formed of highly rigid and conductive metal. Such a carriage 5 is able to ensure grounding and rigidity. The carriage 5 may be formed of a metal material, such as aluminum, stainless steel, or magnesium. Note that the carriage 5 may be formed of another material, such as resin.

Figure 9:
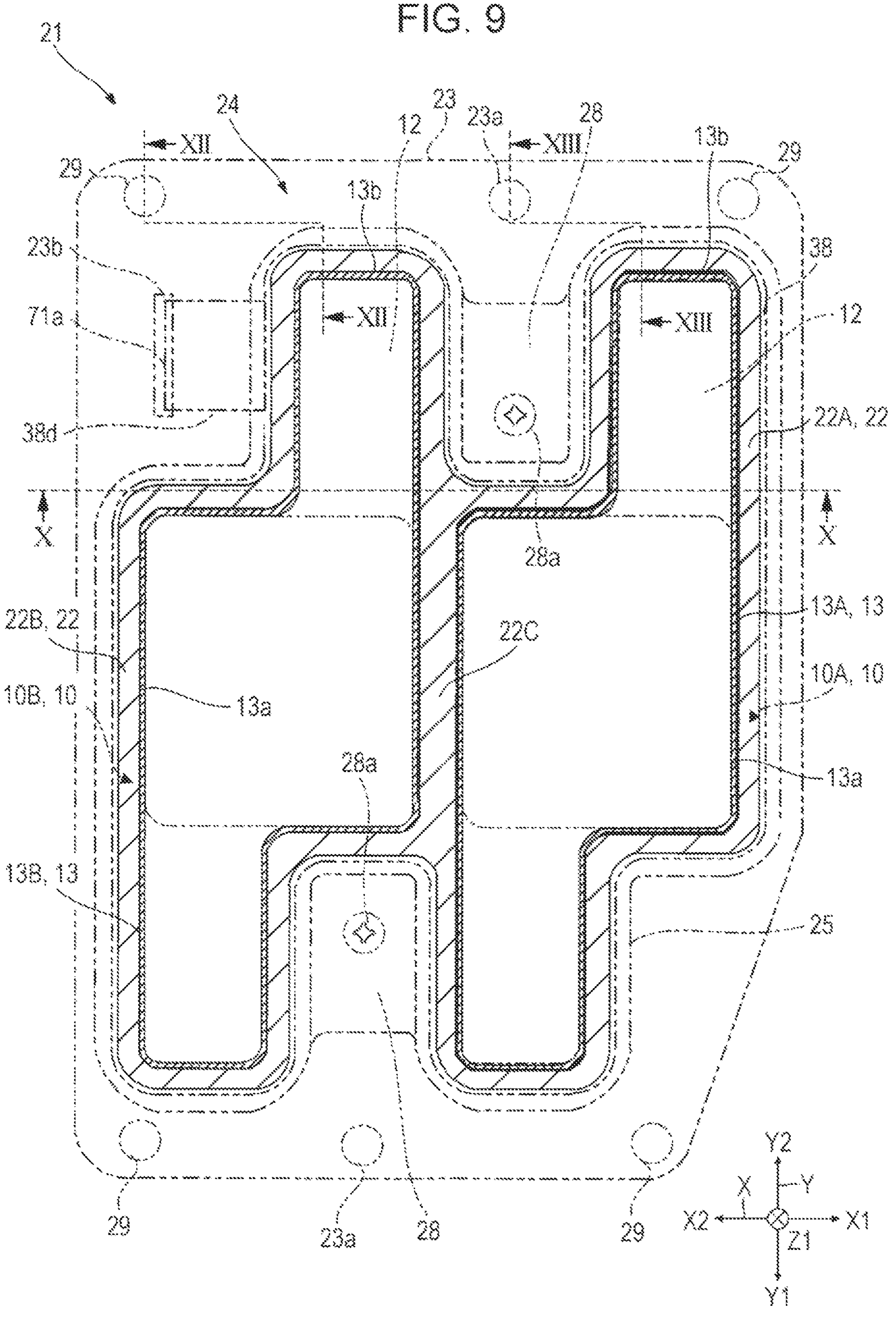
FIG. 9 is a sectional view illustrating a frame of the sub-carriage and illustrates a cross section intersecting the Z-axis direction.
Figure 10:
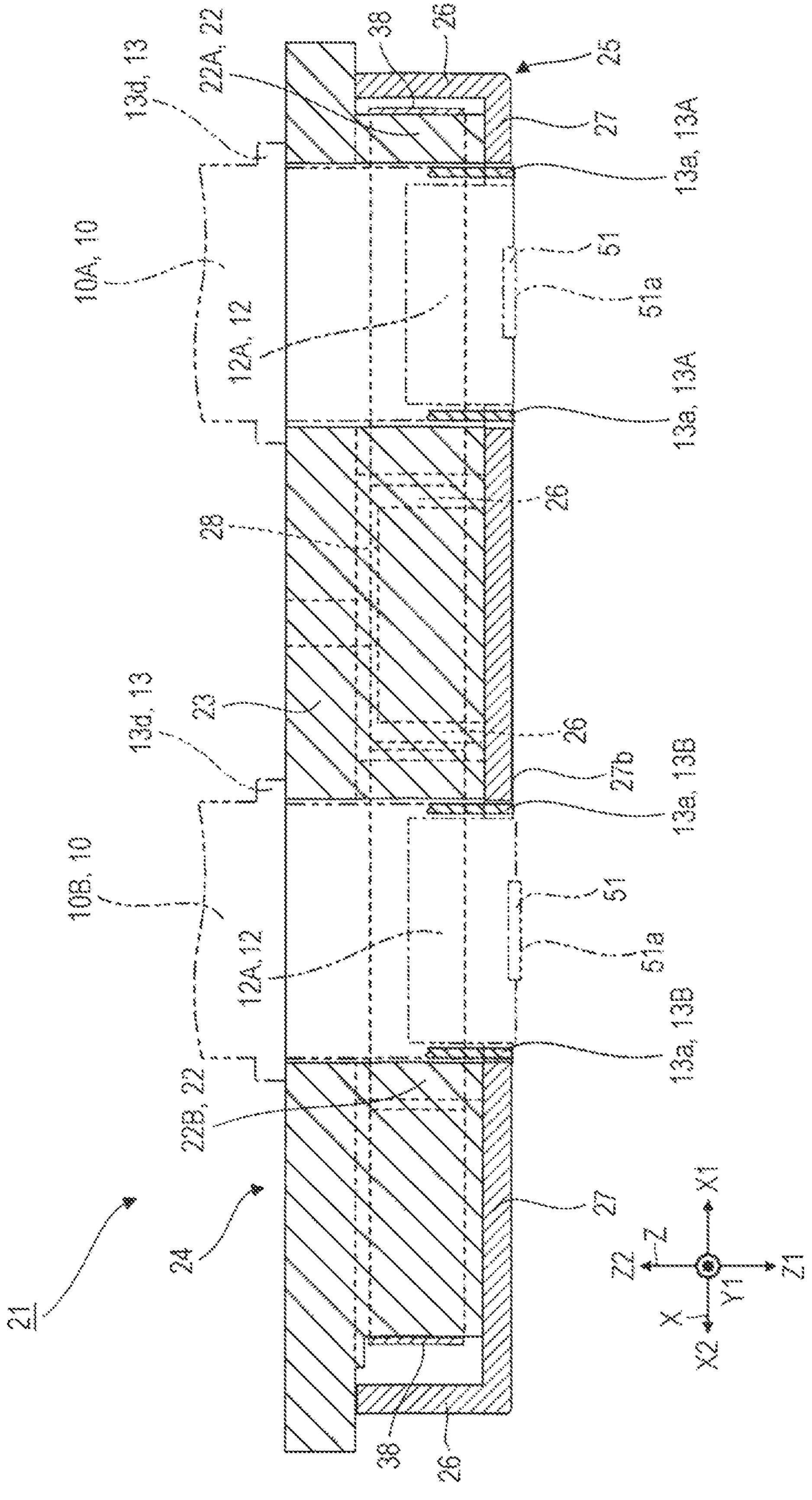
FIG. 10 is a sectional view illustrating the sub-carriage and illustrates a cross section along line X-X in FIG. 9.
Figure 11:
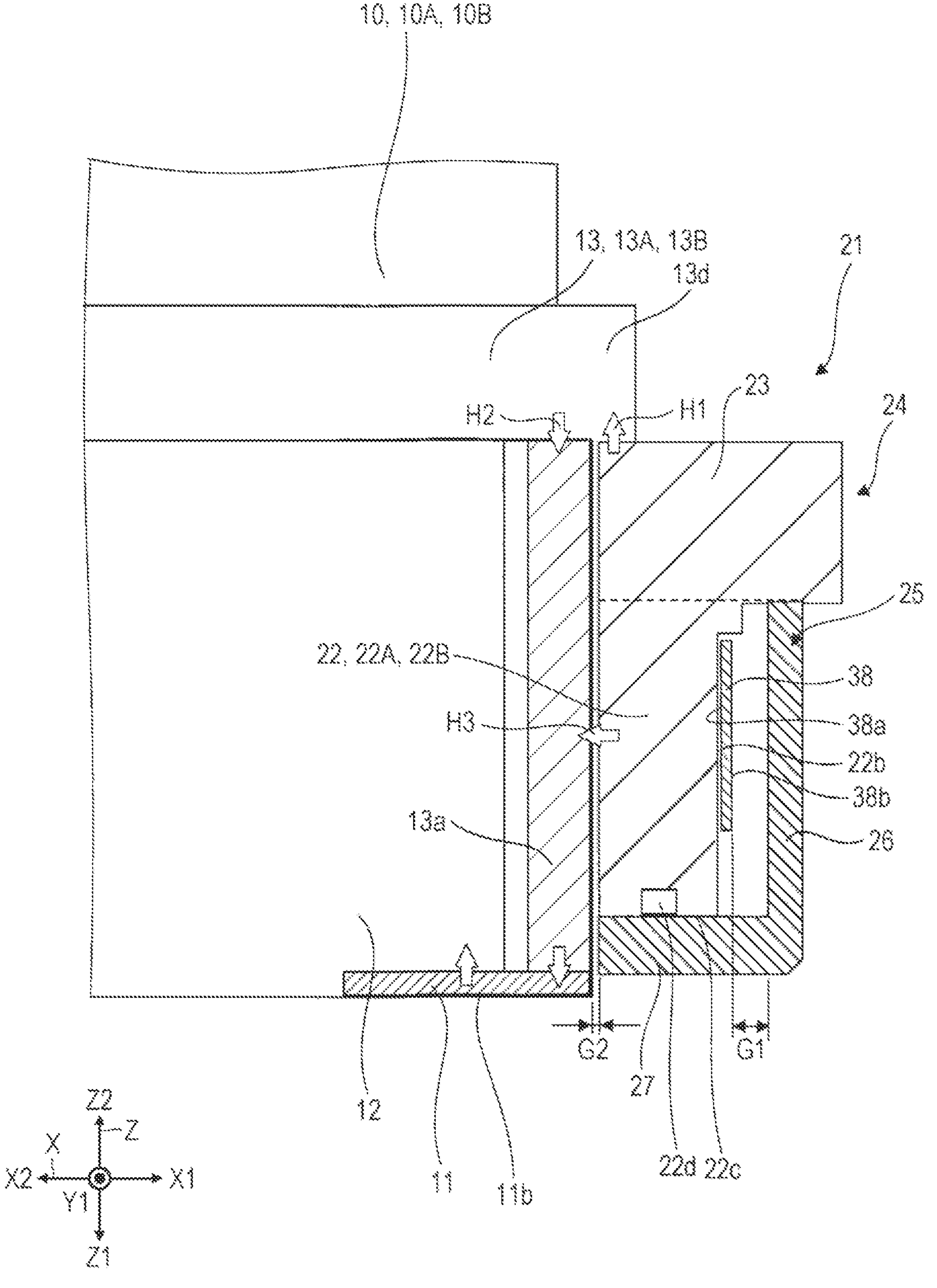
FIG. 11 is a sectional view illustrating a main portion of the sub-carriage in an enlarged manner.
Figure 12:
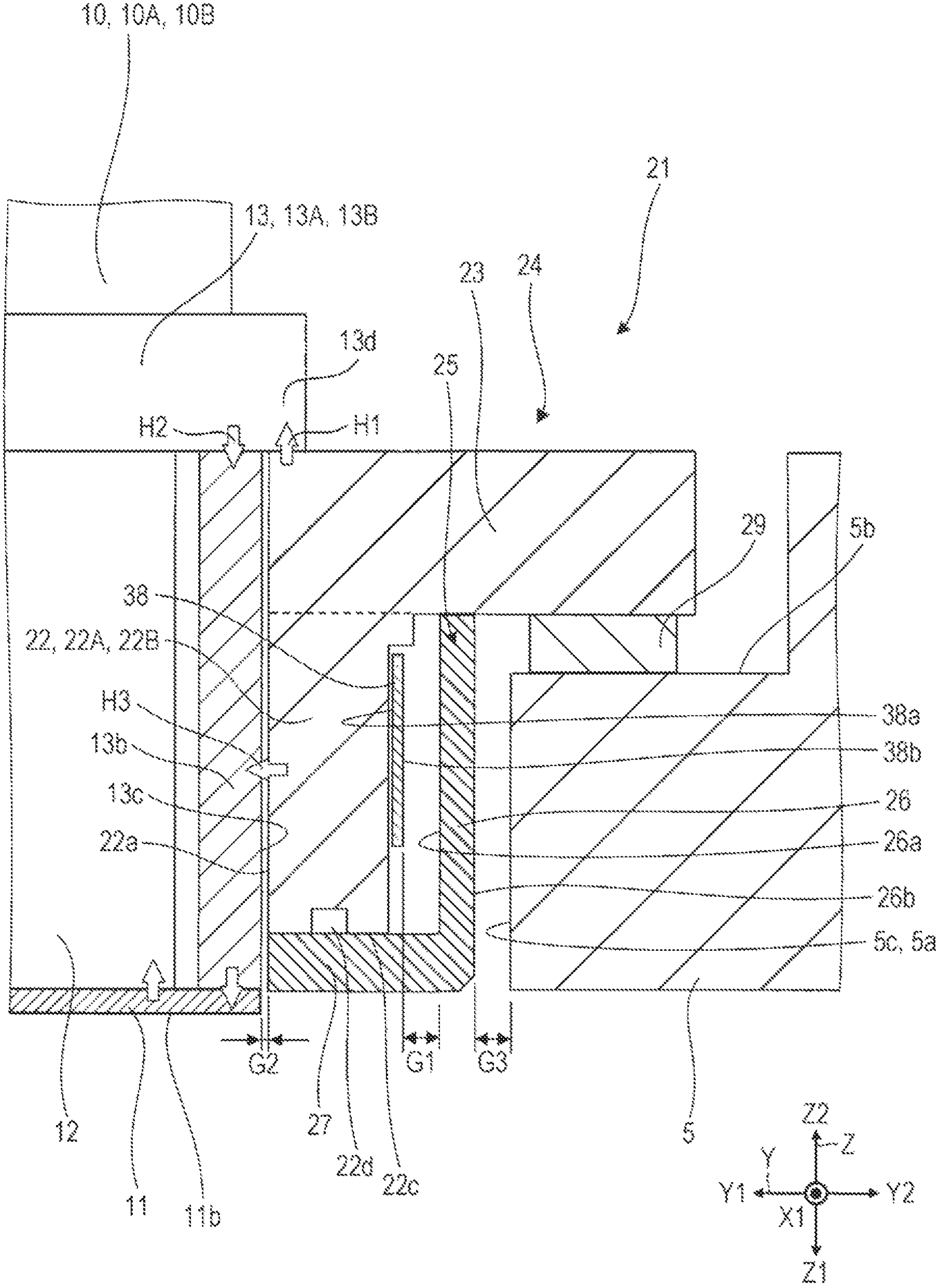
FIG. 12 is a sectional view illustrating a portion in which the sub-carriage and a carriage are coupled and illustrates a cross section along line XII-XII in FIG. 9.
Figure 13:
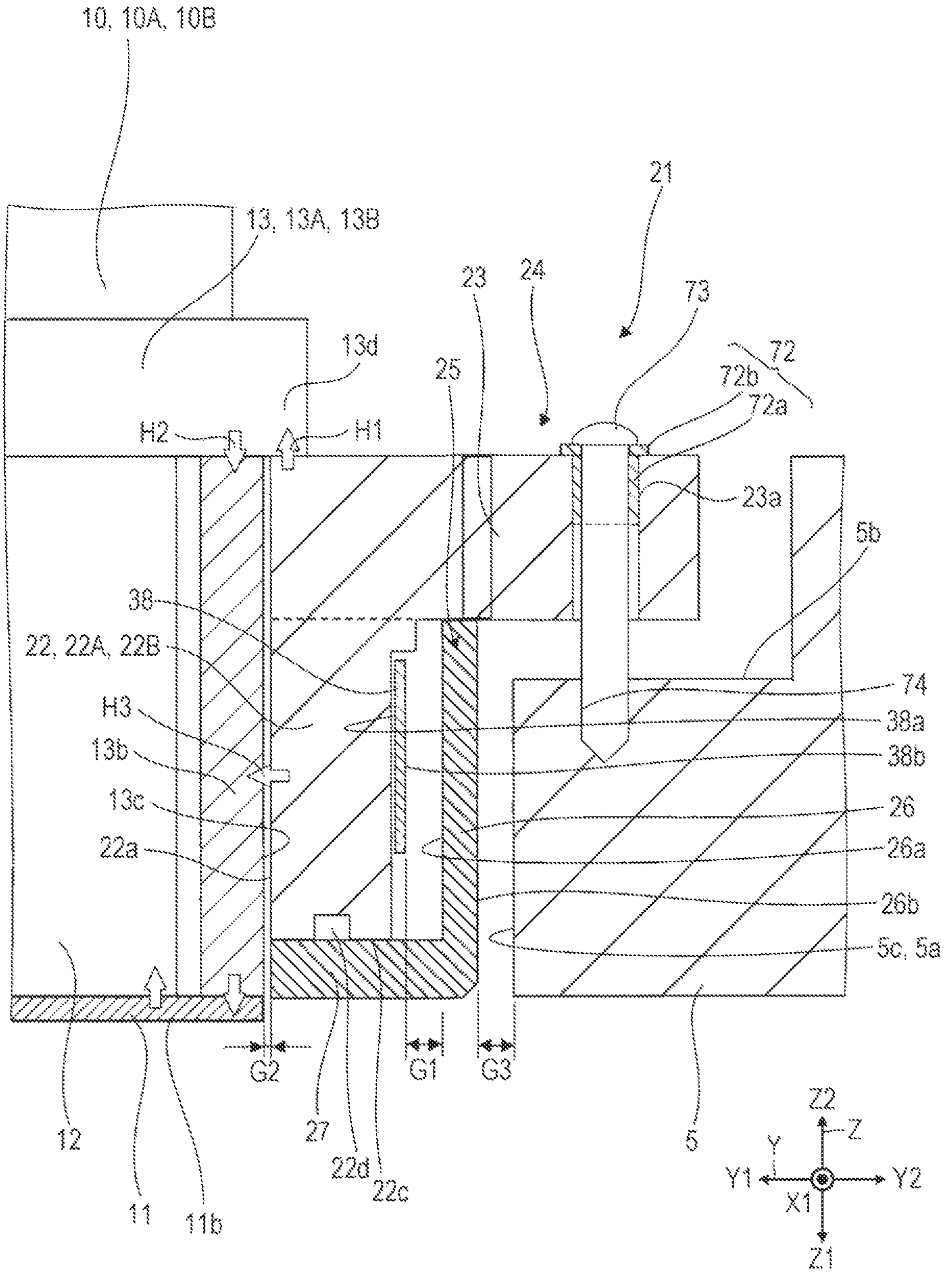
FIG. 13 is a sectional view illustrating a portion in which the sub-carriage and the carriage are fixed and illustrates a cross section along line XIII-XIII in FIG. 9.
Figure 14:
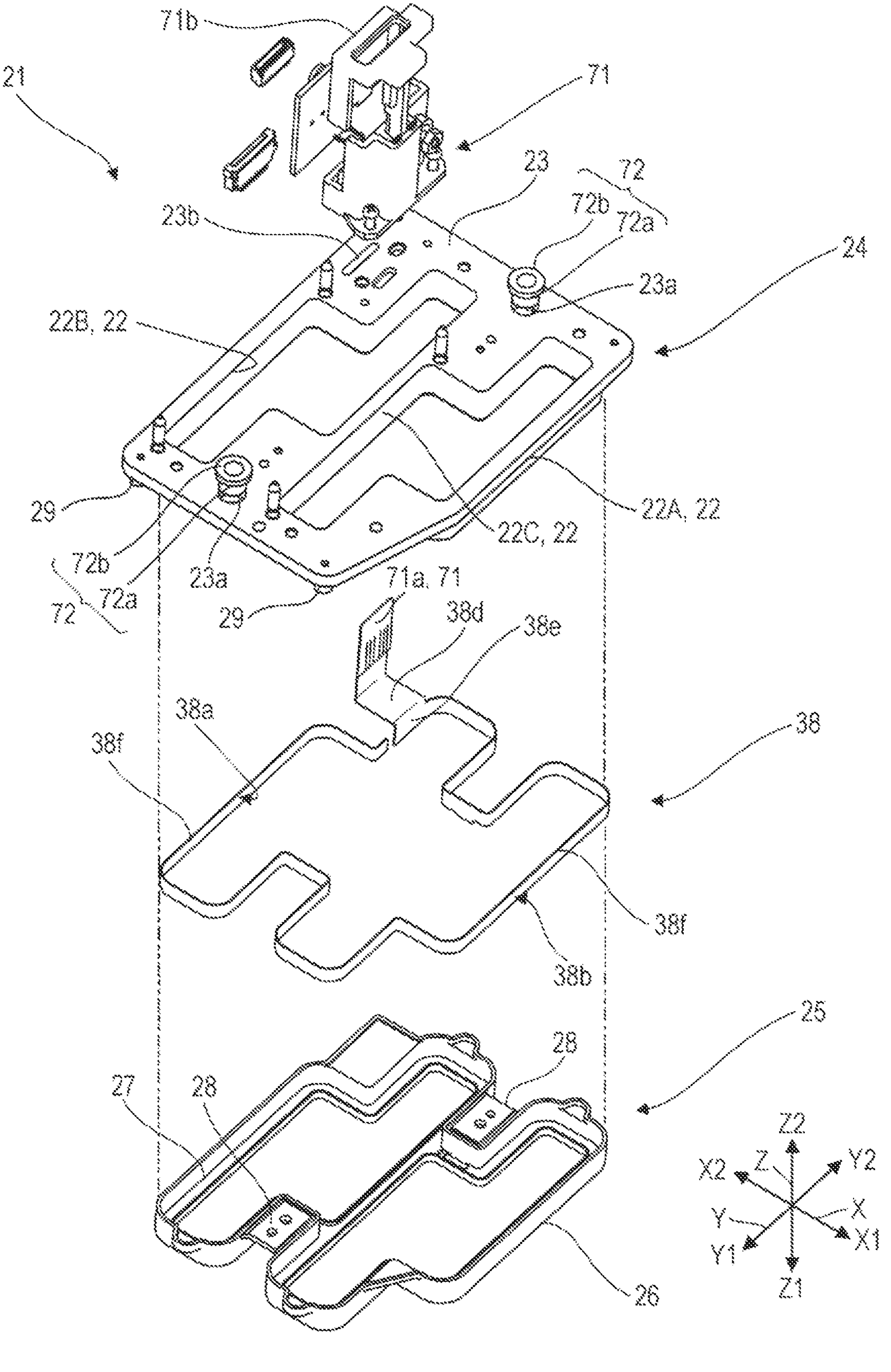
FIG. 14 is an exploded perspective view illustrating the sub-carriage.

FIG. 9 is a sectional view illustrating a frame 22 of the sub-carriage 21 and illustrates a cross section intersecting the Z-axis direction. FIG. 10 is a sectional view illustrating the sub-carriage 21 and illustrates a cross section along line X-X in FIG. 9. FIG. 11 is a sectional view illustrating a main portion of the sub-carriage 21 in an enlarged manner. FIG. 12 is a sectional view along line XII-XII in FIG. 9 and illustrates a portion in which the sub-carriage 21 and the carriage 5 are coupled. FIG. 13 is a sectional view along line XIII-XIII in FIG. 9 and illustrates a portion in which the sub-carriage 21 and the carriage 5 are fixed. FIG. 14 is an exploded perspective view illustrating the sub-carriage 21.

As illustrated in FIGS. 9 to 14, the sub-carriage 21 includes a block 24, the heater 38, and a cover 25. The block 24 includes the frame 22 and a base section 23. The block 24 is formed of, for example, metal or thermally conductive ceramic. The block 24 may be formed of an alloy including at least one of aluminum, copper, silver, and gold. The block 24 is an example of a first member. The heater 38 is an example of a heating section. The cover 25 is an example of a second member. The frame 22 is an example of a first frame body.

As illustrated in FIG. 9, the frame 22 is formed so as to enclose the liquid ejecting head 10 when viewed in the Z-axis direction. The base section 23 holds the liquid ejecting head 10. The base section 23 may hold the liquid ejecting head 10 via another portion. A portion of the holder 13 of the liquid ejecting head 10 may be arranged in the Z2 direction with respect to the frame 22. For example, the flange 13*d* of the holder 13 may be arranged in the Z2 direction with respect to the frame 22. For example, the liquid ejecting head 10 may be held by the frame 22 in a state in which the base section 23 is arranged in the Z2 direction with respect to the frame 22 and in which a portion of the liquid ejecting head 10 is arranged in the Z2 direction with respect to the base section 23. A stepped surface for holding the liquid ejecting head 10 may be formed in the frame 22. The frame 22 may include a portion formed so as to protrude further than the base section 23 in the Z2 direction. In such a configuration, the liquid ejecting head 10 may be held by the Z2 direction end of the frame 22. The head chip 12 is arranged inside the frame 22 when viewed in the Z-axis direction.

The frame 22 is formed of, for example, stainless steel and may be formed of another metal.

The base section 23 has, for example, a plate shape. The base section 23 has a thickness direction extending in the Z-axis direction. The base section 23 protrudes further outward than the frame 22 when viewed in the Z-axis direction. The base section 23 is arranged in the Z2 direction with respect to the frame 22. As illustrated in FIGS. 12 and 13, the base section 23 protrudes further than the frame 22 in the Y2 direction. The base section 23 is arranged so as to overlap the sub-carriage supporting section 5*b* of the carriage 5 when viewed in the Z-axis direction. An end of the base section 23 is arranged in the Z2 direction with respect to the sub-carriage supporting section 5*b*.

As illustrated in FIG. 13, the block 24 may be fastened to the carriage 5 by a screw 73 formed of metal via a bushing 72 formed of resin. The bushing 72 includes a cylindrical portion in which a through hole into which the screw 73 is inserted is formed. An internal thread 74 into which the screw 73 is fitted is formed in the carriage 5. The bushing 72 includes an insertion section 72*a* press-fitted in a hole 23*a* formed in the base section 23 and includes a collar section 72*b* that protrudes further outward than the insertion section 72*a* when viewed in the Z-axis direction. The collar section 72*b* is a portion held between the head of the screw 73 and a surface of the base section 23 facing the Z2 direction. Moreover, a contact section 29, which will be specifically described later, enables a surface of the base section 23 facing the Z1 direction and a surface of the sub-carriage supporting section 5*b* facing the Z2 direction to face each other with a gap therebetween. Thus, heat from the base section 23 is suppressed from being transferred to the sub-carriage supporting section 5*b* by thermal conduction. The screw 73 may be formed of a metal material having high viscosity, such as iron, stainless steel, or brass. The screw 73 may be formed of aluminum, titanium, or the like. The bushing 72 may be formed of, for example, a resin material having high heat resistance. The bushing 72 is formed of a heat-resistant resin material having a thermal conductivity of less than 1.0 W/m·K. The bushing 72 is formed of, for example, PEEK and may be formed of another resin material. "PEEK" is an abbreviation for polyether ether ketone. Note that the bushing 72 may be formed of, for example, a heat-resistant ceramic having a thermal conductivity of less than 10.0 W/m·K at a normal temperature. The bushing 72 is interposed between the screw 73 and the base section 23, and the screw 73 and the base section 23 are not in contact with each other. Thus, heat is suppressed from being transferred from the base section 23 to the carriage 5 via the screw 73.

The frame 22 and the base section 23 are formed integrally. Note that the frame 22 and the base section 23 may be formed separately. The frame 22 and the base section 23 formed separately may be joined to each other.

As illustrated in FIGS. 11 to 13, the frame 22 faces the side walls 13*a* and 13*b* of the holder 13 of the liquid ejecting head 10. As illustrated in FIG. 11, the side wall 13*a* of the holder 13 faces the frame 22 in the X-axis direction. As illustrated in FIGS. 12 and 13, the side wall 13*b* of the holder 13 faces the frame 22 in the Y-axis direction. The frame 22 is arranged so as to overlap the side walls 13*a* and 13*b* when viewed in the X-axis direction and the Y-axis direction. The heater 38 is arranged so as to hold the frame 22 against the side walls 13*a* and 13*b* when viewed in the Z-axis direction. In other words, a portion of the block 24 is arranged between the heater 38 and the side walls 13*a* and 13*b*. The frame 22 and the heater 38 are not necessarily in direct contact with each other as long as heat from the heater 38 is able to be transferred to the frame 22, in other words, as long as no heat-insulating member having a thermal conductivity of less than 1.0 W/m·K at a normal temperature is interposed between the heater 38 and the frame 22. However, even in an instance in which a heat-insulating member is interposed between the heater 38 and the frame 22, when the heat-insulating member is, for example, an adhesive or a film, which is configured to be thin, thermal resistance of the heat-insulating member is considerably low and negligible, and the heat from the heater 38 is thus able to be transferred to the frame 22. Similarly, the frame 22 is not necessarily in direct contact with the side walls 13*a* and 13*b* as long as heat is able to be transferred from the frame 22 to the side walls 13*a* and 13*b*.

Figure 15:
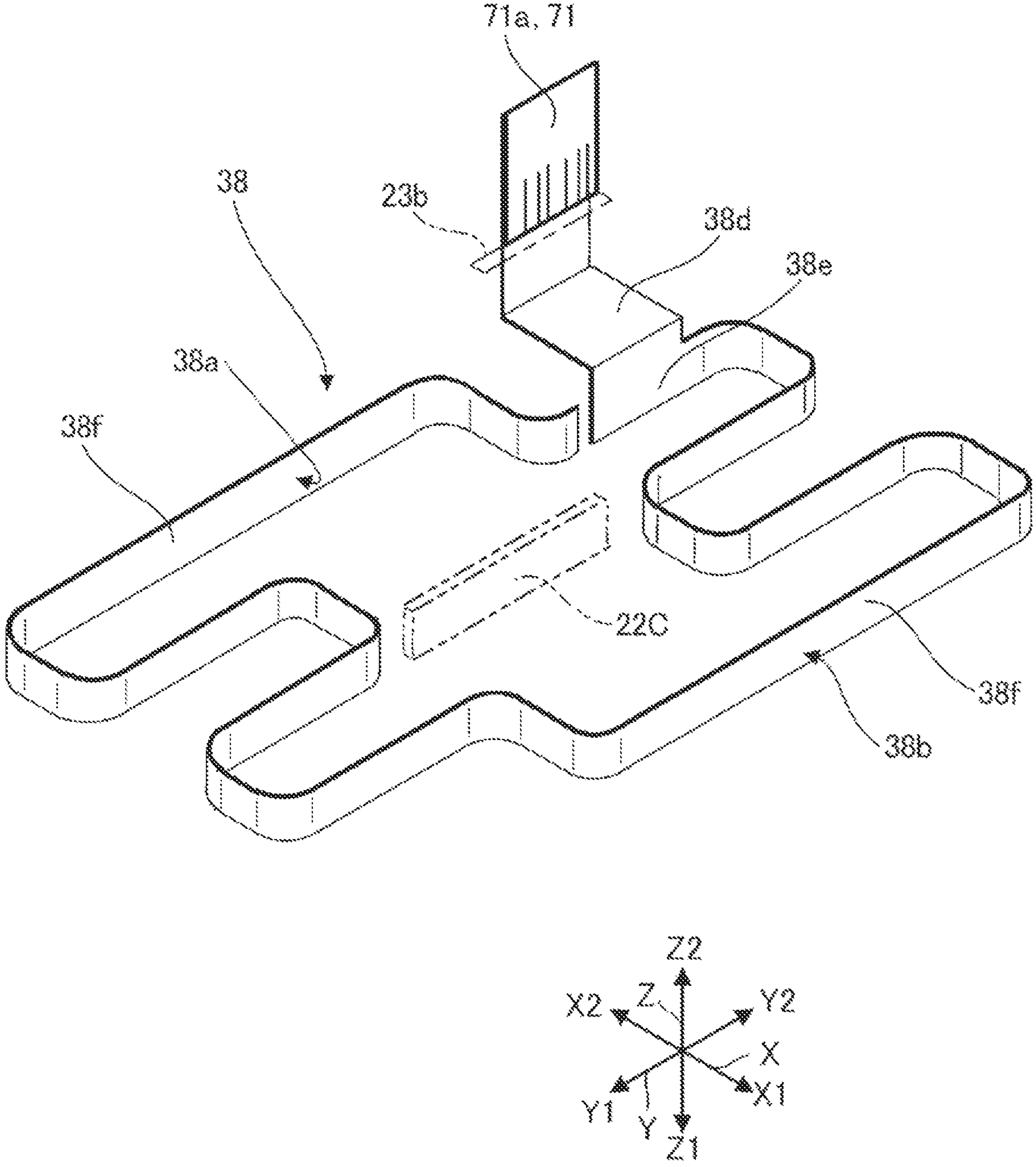
FIG. 15 is a perspective view illustrating a heater provided on an outer peripheral surface of the frame of the sub-carriage.

FIG. 15 is a perspective view illustrating the heater 38. The heater 38 illustrated in FIGS. 9 to 15 has a film shape. The heater 38 generates heat by using electric resistance. For example, copper or stainless steel is able to be adopted as an electric resistance element of the heater 38. The heater 38 is arranged so as to enclose the fixing plate 11 of the liquid ejecting head 10 and the frame 22 of the sub-carriage 21 when viewed in the Z-axis direction. The heater 38 has a thickness direction extending in the thickness direction of the side walls 13*a* and 13*b* and in a thickness direction of the frame 22. The thickness direction of the heater 38 extends in the X-axis direction in the cross sections illustrated in FIGS. 10 and 11.

An inner peripheral surface 38*a* of the heater 38 may be in contact with an outer peripheral surface 22*b* of the frame 22. The heater 38 may be fixed to the outer peripheral surface 22*b* via heat dissipation grease. The thickness direction of the heater 38 extends in the Y-axis direction in the cross sections illustrated in FIGS. 12 and 13. The heater 38 is indicated by a two-dot chain line in FIG. 9. The heater 38 is formed so as to enclose the frame 22 of the sub-carriage 21. The fixing plate 11 and the nozzle plate 51 are arranged inside the frame 22 when viewed in the Z-axis direction. A bottom surface 11*b*, which is a surface of the fixing plate 11 facing the Z1 direction, and a nozzle surface 51*a*, which is a surface of the nozzle plate 51 facing the direction Z1, are examples of an ejection surface of the liquid ejecting head 10.

The cover 25 illustrated in FIGS. 9 to 14 is arranged so as to cover the heater 38. As illustrated in FIGS. 10 to 14, the cover 25 includes a first portion 26 and a second portion 27. The first portion 26 has a plate shape. The first portion 26 has a thickness direction extending in the thickness direction of the heater 38. The first portion 26 is arranged so as to enclose the heater 38 when viewed in the Z-axis direction. The dimension of the first portion 26 in the Z-axis direction is longer than the dimension of the heater 38 in the Z-axis direction. The thickness direction of the first portion 26 extends in the X-axis direction in the cross sections illustrated in FIGS. 10 and 11. The thickness direction of the first portion 26 extends in the Y-axis direction in the cross sections illustrated in FIGS. 12 and 13. A gap G1 is formed between an outer peripheral surface 38*b* of the heater 38 and an inner peripheral surface 26*a* of the first portion 26. The first portion 26 of the cover 25 is provided so as to enclose the heater 38 with the gap G1 between the first portion 26 and the heater 38 when viewed in the Z-axis direction. The gap G1 is an example of a first gap.

The second portion 27 of the cover 25 is arranged so as to cover a surface 22*c* provided in the Z1 direction end of the frame 22. The surface 22*c* of the frame 22 in the Z1 direction is an example of an end of the first frame body in the ejection direction. The surface 22*c* and the second portion 27 are bonded to each other with an adhesive (not illustrated). A recess 22*d* is formed in the surface 22*c* in the Z2 direction and has a function enabling a residual portion of the adhesive between the surface 22*c* and the second portion 27 to be discharged. The second portion 27 protrudes from the Z1 direction end of the first portion 26 to the frame 22. The second portion 27 has a plate shape. The second portion 27 has a thickness direction extending in the Z-axis direction. The second portion 27 covers a surface of the Z1 direction end of the block 24.

Here, thermal conductivity of the cover 25 is lower than thermal conductivity of the block 24. Since the second portion 27 of the cover 25 covers a bottom portion of the block 24 in the sub-carriage 21, the block 24 is not exposed in the Z1 direction. This makes it possible to suppress heat release from the block 24 heated by the heater 38. Since the cover 25 covers both the block 24 and the heater 38, neither the block 24 nor the heater 38 is exposed in the Z1 direction. Accordingly, ink ejected from the nozzle surface 51*a* or mist that separates from ink is suppressed from attaching to the block 24 and the heater 38. Further, when stainless steel or ceramic having high liquid resistance is adopted for the second portion 27, the block 24 and the heater 38 are able to be protected from ink, and highly thermally conductive aluminum is able to be adopted for the block 24. As a result, the sub-carriage 21 is able to have improved liquid resistance to the ink, and the block 24 is able to have improved thermal conductivity.

Moreover, since a surface area of the block 24 exposed to ambient air is able to be reduced by covering the block 24 with the cover 25, it is possible to suppress convection heat transfer due to a relative air flow generated during transportation of the sub-carriage 21. As a result, it is possible to suppress heat release from the block 24 heated by the heater 38.

The side walls 13*a* and 13*b* and the flange 13*d* of the holder 13 of the liquid ejecting head 10 are thermally conductive. The side walls 13*a* and 13*b* of the holder 13 are in thermal contact with the block 24 of the sub-carriage 21. "Thermal contact" includes a state in which heat is able to be transferred between the side wall 13*a* and the block 24, specifically, a state in which the side walls 13*a* and 13*b* and the flange 13*d* are integrally formed of a thermally conductive material and a state in which the side walls 13*a* and 13*b* and the flange 13*d* are constituted by a plurality of separate thermally conductive members. The flange 13*d* of the holder 13 is in contact with the base section 23. Heat from the block 24 is transferred to the side walls 13*a* and 13*b* via the flange 13*d*. Some heat from the block 24 is transferred to the side walls 13*a* and 13*b* by thermal conduction as indicated by arrows H1 and H2.

Some heat from the block 24 is transferred from the block 24 to the side walls 13*a* and 13*b* by radiation and thermal conduction in which heat transfers in the air in a gap G2, which will be described below, as indicated by arrow H3. Specifically, some heat from the frame 22 is transferred to the side walls 13*a* and 13*b* by radiation and thermal conduction in which heat transfers in the air in the gap G2.

The thermal conductivity of the block 24 is higher than the thermal conductivity of the side walls 13*a* and 13*b*. As described above, the thermal conductivity of the cover 25 is lower than the thermal conductivity of the block 24. Further, the thermal conductivity of the cover 25 is lower than the thermal conductivity of the side walls 13*a* and 13*b*. When the cover 25 is made of ceramic, thermal conductivity of the ceramic may be less than, for example, 10.0 W/m·K at a normal temperature. A normal temperature may be, for example, from 15° C. to 25° C. The thermal conductivity of the cover 25 may be less than, for example, 5.0 W/m·K. The thermal conductivity of the cover 25 may be less than, for example, 1.0 W/m·K. When the cover 25 is made of resin, thermal conductivity of the resin may be less than, for example, 1.0 W/m·K at a normal temperature. For example, when the side walls 13*a* and 13*b* are formed of stainless steel or titanium, the cover 25 may be formed of ceramic or resin having a thermal conductivity lower than the thermal conductivity of the side walls 13*a* and 13*b*.

The gap G2 is formed between the frame 22 and the side wall 13*b* when viewed in the Z-axis direction. The gap G2 is an example of a second gap. The gap G2 is a gap between an inner peripheral surface 22*a* of the frame 22 and an outer peripheral surface 13*c* of the side wall 13*b*. The gap G1 is greater than the gap G2 when viewed in the Z-axis direction. The gap G1 may be equal to or more than 0.75 mm or may be equal to or more than 1.00 mm. The gap G2 may be more than 0.00 mm and equal to or less than 0.15 mm. The gap G2 may exceed, for example, 0.15 mm. When the gap G2 exceeds 0.15 mm, a heat transfer sheet having thermal conductivity equal to or more than 1.0 W/m·K at a normal temperature may be arranged in the gap G2. When the gap G2 is equal to or less than 0.15 mm, heat is able to be transferred from the frame 22 to the side wall 13*b* by radiation and thermal conduction in which heat transfers in the air in the gap G2, and it is not necessary to provide a heat transfer sheet, thus making it possible to reduce a degradation in aligning accuracy of the liquid ejecting head 10 with respect to the sub-carriage 21, which is caused by providing a heat transfer sheet in the gap G2. When the gap G1 is equal to or more than 0.75 mm, it is possible to suppress heat from being transferred from the heating section 38 to the first portion 26 of the cover 25 via the gap G1 by radiation and thermal conduction in which heat transfers in the air in the gap G1.

The first portion 26 of the cover 25 is arranged between an inner peripheral surface 5*c* of the opening 5*a* of the carriage 5 and the frame 22 when viewed in the Z-axis direction. A gap G3 is formed between an outer peripheral surface 26*b* of the first portion 26 of the cover 25 and the inner peripheral surface 5*c* of the opening 5*a* of the carriage 5 when viewed in the Z-axis direction. The gap G3 is greater than the gap G2. The gap G3 is an example of a third gap. Since the gap G3 is greater than the gap G2 in the head unit 20, it is possible to suppress heat release from the first portion 26 of the cover 25 to the carriage 5.

As illustrated in FIG. 12, the sub-carriage 21 includes the contact section 29 that protrudes from the base section 23 to the carriage 5 to come into contact with the carriage 5. Thermal conductivity of the contact section 29 is lower than the thermal conductivity of the side wall 13*b*. The thermal conductivity of the contact section 29 at a normal temperature may be less than, for example, 10.0 W/m·K. The thermal conductivity of the contact section 29 at a normal temperature may be less than 5.0 W/m·K. The thermal conductivity of the contact section 29 at a normal temperature may be less than 1.0 W/m·K. The contact section 29 is arranged on the Z2 direction side of the sub-carriage supporting section 5*b* of the carriage 5. The contact section 29 protrudes from the base section 23 in the Z1 direction to come into contact with the sub-carriage supporting section 5*b*. The contact section 29 may be formed of, for example, ceramic made of zirconia. Thermal conductivity of zirconia at a normal temperature is, for example, 3.0 W/m·K. When the contact section 29 is formed of ceramic made of zirconia, it is possible to ensure strength of the contact section 29 and reduce the thermal conductivity. Further, when ceramic made of zirconia is used, it is possible to improve flatness of a surface of the contact section 29 in contact with the sub-carriage supporting section 5*b*. Note that the contact section 29 is not limited to being formed of ceramic and may be formed of another material. The contact section 29 may be formed of, for example, a resin material.

As illustrated in FIG. 10, the nozzle surface 51*a* of the nozzle plate 51 of the head chip 12 may be located in the Z1 direction with respect to a surface 27*b* of the second portion 27 of the cover 25 in the Z1 direction. The nozzle surface 51*a* is the Z1 direction surface of the nozzle plate 51. The nozzle surface 51*a* is an example of an ejection surface in which nozzles N are formed. The surface 27*b* of the cover 25 is an example of an end of the sub-carriage 21 in the ejection direction. Note that the ejection surface may include both the nozzle surface 51*a* and the bottom surface 11*b* of the fixing plate 11. In an instance in which the ejection surface is located in the Z1 direction with respect to the surface 27*b* of the sub-carriage 21 in the Z1 direction, for example, when a wiping operation is performed during maintenance, it is possible to suppress ink from attaching to the sub-carriage 21. It is possible to suppress ink from attaching to the block 24 of the sub-carriage 21, and the block 24 is thus protected.

As illustrated in FIGS. 1, 9, and 10, the sub-carriage 21 is able to hold the plurality of liquid ejecting heads 10. The block 24 of the sub-carriage 21 holds the liquid ejecting heads 10A and 10B. As illustrated in FIGS. 9, 10, and 13, the heater 38 is a heater of a planar shape enclosing both the liquid ejecting heads 10A and 10B.

Since a single heater 38 encloses both the liquid ejecting heads 10A and 10B in the sub-carriage 21, it is not necessary to provide heaters that separately enclose the liquid ejecting heads 10A and 10B. Accordingly, it is possible to facilitate ease of manufacturing of the sub-carriage 21 and reduce cost thereof. As a heater of a planar shape, for example, a film heater, a silicone rubber heater, or a space heater is able to be adopted for the sub-carriage 21.

Next, a common portion 22C of the frame 22 will be described. As illustrated in FIG. 9, the frame 22 includes a frame 22A and a frame 22B. The frame 22A encloses the side walls 13*a* and 13*b* of a holder 13A of the liquid ejecting head 10A when viewed in the Z-axis direction. The frame 22B encloses the side walls 13*a* and 13*b* of a holder 13B of the liquid ejecting head 10B when viewed in the Z-axis direction. The frames 22A and 22B have the common portion 22C, at least a portion of which is shared, between the liquid ejecting head 10A and the liquid ejecting head 10B.

The heater 38 is provided along the outer periphery of the frame 22. The outer periphery of the frame 22 does not include the common portion 22C. Note that the common portion 22C is indicated by an imaginary line in FIG. 15. The heater 38 is formed so as to enclose the entire periphery of the side walls 13*a* and 13*b* excluding the common portion 22C when viewed in the Z-axis direction. Here, "enclose the entire periphery of the side walls 13*a* and 13*b*" includes a state in which the heater 38 encloses 70% or more of the entire periphery of the side walls 13*a* and 13*b*. Note that it is more desirable that, as illustrated in FIG. 13, the heater 38 be formed so as to enclose 90% or more of the entire periphery of the side walls 13*a* and 13*b*. The heater 38 may be arranged to correspond to at least a portion of each side wall 13*a* extending in the Y-axis direction. The heater 38 may be arranged to correspond to at least a portion of each side wall 13*b* extending in the X-axis direction. A portion of the heater 38 is arranged so as to overlap the side wall 13*a* when viewed in the X1 direction. A portion of the heater 38 is arranged so as to overlap the side wall 13*a* when viewed in the X2 direction. A portion of the heater 38 is arranged so as to overlap the side wall 13*b* when viewed in the Y1 direction. A portion of the heater 38 is arranged so as to overlap the side wall 13*b* when viewed in the Y2 direction. The heater 38 is arranged so as to overlap at least a portion of the frame 22 in all the four directions of the X1 direction, the X2 direction, the Y1 direction, and the Y2 direction. Note that the heater 38 does not necessarily overlap the frame 22 in all the four directions of the X1 direction, the X2 direction, the Y1 direction, and the Y2 direction. In other words, it is required only to reduce a variation in temperature of the frame 22 to suppress a variation in temperature of the head chip 12.

A joining portion 38*d* in which the heater 38 and a terminal 71*a* are joined is coupled to a short-side portion 38*e* of the heater 38. The joining portion 38*d* is desirably coupled to a portion of the heater 38 other than a long-side portion 38*f*. The long-side portion 38*f* is a portion that has a maximum dimension in, for example, the Y-axis direction. The short-side portion 38*e* may be a portion shorter than the long-side portion 38*f* in a portion extending in the Y-axis direction. Note that the short-side portion 38*e* is arranged on the X2 direction side of the Y2 direction end of the head chip 12A of the liquid ejecting head 10B illustrated in FIG. 4.

Next, fixing of the cover 25 and the block 24 will be described. As illustrated in FIGS. 9 and 10, the cover 25 includes a third portion 28 arranged between the frame 22A and the frame 22B at a position not overlapping the common portion 22C when viewed in the Z-axis direction. As illustrated in FIG. 10, the third portion 28 is joined to the Z2 direction end of the first portion 26. The third portion 28 has a plate shape and a thickness direction extending in the Z-axis direction. The third portion 28 is fixed to the base section 23 of the block 24. For example, the third portion 28 and the base section 23 are fixed by using a screw 28*a*.

In the sub-carriage 21, the screw 28*a* is arranged at a position overlapping the third portion 28 when viewed in the Z-axis direction such that the block 24 and the cover 25 are fixed, and a space of the base section 23 is thus able to be efficiently used. It is possible to suppress a size increase of the base section 23 in the sub-carriage 21.

Next, arrangement of a connector 71 for the heater 38 will be described. As illustrated in FIGS. 4 and 5, the head unit 20 includes the connector 71 for the heater 38. The connector 71 is used to couple the heater 38 to an electric wire for supplying power to the heater 38. The connector 71 includes the terminal 71*a* electrically coupled to the heater 38 of a film shape and a case 71*b* covering the terminal 71*a*.

As illustrated in FIG. 4, the connector 71 is arranged in the Y2 direction with respect to the head chip 12B of the liquid ejecting head 10B and the X2 direction with respect to the head chip 12A of the liquid ejecting head 10B. The connector 71 is arranged at a position overlapping neither the liquid ejecting head 10A nor the liquid ejecting head 10B when viewed in the Z-axis direction. The connector 71 is held by the base section 23 of the sub-carriage 21. As illustrated in FIG. 9, an opening 23*b* into which the terminal 71*a* is inserted is formed in the base section 23. The terminal 71*a* is drawn out in the Z2 direction with respect to the base section 23 through the opening 23*b*.

Next, a heat transfer path of the head unit 20 will be described with reference to FIGS. 11 to 13. The frame 22 of the block 24 is heated by the heater 38. The frame 22 and the base section 23 of the block 24 are heated to substantially the same temperature. The heat from the frame 22 is transferred to the side walls 13*a* and 13*b* of the holder 13 by radiation and thermal conduction in which heat transfers in the air in the gap G2. The heat from the base section 23 is transferred to the flange 13*d* of the holder 13 by thermal conduction. The heat from the flange 13*d* is transferred to the side walls 13*a* and 13*b* by thermal conduction. The heat from the side walls 13*a* and 13*b* is transferred to the fixing plate 11. As illustrated in FIG. 8, the heat from the fixing plate 11 is transferred to the communication plate 54. Since the compliance substrate 53 has a thinner thickness and lower heat resistance than the fixing plate 11 and the support plate 52 in the present embodiment is formed of thermally conductive metal, the heat is not prevented from being transferred from the fixing plate 11 to the communication plate 54. The heat from the communication plate 54 heats ink in a channel of the communication plate 54. As a result, ink in the liquid ejecting head 10 is able to be heated in the sub-carriage 21.

For example, regarding the amount of ink in the common liquid chamber 41 in the liquid ejecting head 10 of the present embodiment, the amount of ink in the center portion 81 of the liquid ejecting head 10 in the Y-axis direction is greater than those in the protrusion 82, which is the Y2 direction end, and the protrusion 83, which is the Y1 direction end. This is because two head chips 12 overlap each other in the center portion 81 when viewed in the X-axis direction as illustrated in FIG. 4. Accordingly, it is difficult to heat the center portion 81 in the Y-axis direction compared with the protrusions 82 and 83, which are the ends in the Y-axis direction. Here, for example, a configuration (hereinafter, referred to as a comparative example) in which the heater 38 is directly fixed to the side walls 13*a* and 13*b* of the liquid ejecting head 10 is assumed. In the comparative example, the heat from the heater 38 is transferred into the channel of the communication plate 54 via the side walls 13*a* and 13*b* and the fixing plate 11. In the comparative example, since a distance from the heater 38 to the common liquid chamber 41 is short, it is difficult for the heat from the heater 38 to transfer in the in-plane direction of the heater 38, for example, the Y-axis direction. Thus, in the liquid ejecting head 10, temperature in the vicinity of the center portion 81 which is difficult to be heated due to a large amount of ink in the common liquid chamber 41 is lower than temperature in the vicinity of the protrusion 82 and the protrusion 83 which are readily heated due to a small amount of ink in the common liquid chamber 41 compared with the center portion 81, resulting in a variation in temperature of the liquid ejecting head 10 in the Y-axis direction.

On the other hand, in the liquid ejecting apparatus 1 of the present embodiment, the frame 22 whose thermal conductivity is higher than the thermal conductivity of the side walls 13*a* and 13*b* is arranged between the heater 38 and the side walls 13*a* and 13*b* when viewed in the Z-axis direction, the heat from the heater 38 is able to be transferred to the side walls 13*a* and 13*b* via the frame 22. That is, a distance from the heater 38 to the channel in the liquid ejecting head 10, for example, the common liquid chamber 41 is longer than that in the comparative example, and the heat from the heater 38 is readily transferred by the frame 22 in the in-plane direction of the heater 38. Thus, the heat from the heater 38 is transferred so as to be distributed to the liquid ejecting head 10 by the frame 22. Accordingly, heat from portions of the heater 38 provided in the vicinity of the protrusion 82 and the vicinity of the protrusion 83 is able to transfer to the center portion 81 by moving in the frame 22. That is, by interposing the frame 22 between the liquid ejecting head 10 and the heater 38, it is possible to suppress a variation in temperature of the liquid ejecting head 10. Moreover, as illustrated in FIG. 11, the thickness of the frame 22 in a direction (X-axis direction in FIG. 11) perpendicular to the in-plane direction of the heater 38 is desirably greater than the thickness of the side wall 13*a* in the direction perpendicular to the in-plane direction of the heater 38. According to such a configuration, since it is possible to increase a distance from the heater 38 to the liquid ejecting head 10, the heat from heater 38 is able to be transferred to the liquid ejecting head 10 so as to be further distributed in the in-plane direction of the heater 38. The same is applied to a portion of the frame 22 facing the side wall 13*b*.

Moreover, since the frame 22 is arranged so as to enclose the side walls 13*a* and 13*b*, it is possible to retain substantially uniform temperature around the side walls 13*a* and 13*b*. This makes it possible to retain substantially uniform temperature of the side walls 13*a* and 13*b* and suppress a variation in temperature of the head chip 12 held by the holder 13. As a result, the liquid ejecting apparatus 1 is able to suitably heat the ink in the head chip 12. Since the liquid ejecting apparatus 1 suitably heats the ink in the head chip 12, it is possible to eject the ink from the liquid ejecting head 10 while appropriately keeping ink viscosity.

In the sub-carriage 21, the cover 25 covers the heater 38 when viewed in the Z-axis direction. An air layer, which is the gap G1, is formed between the heater 38 and the cover 25. This reduces heat release caused by radiation from the heater 38 and the frame 22 to the cover 25 and thermal conduction in which heat transfers in the air in the gap G1. Moreover, when the thermal conductivity of the cover 25 is lower than the thermal conductivity of the block 24, it is possible to enable the heat from the heater 38 to be readily transferred to the block 24 but hardly transferred to the cover 25 by thermal conduction. As a result, it is possible to suppress heat release from the heater 38 and suitably heat the block 24.

The sub-carriage 21 has the gap G1 greater than the gap G2. Since the gap G2 between the frame 22 and the side walls 13*a* and 13*b* is narrow in the sub-carriage 21, it is possible to reduce heat resistance of the air in the gap G2, and heat is suitably transferred from the frame 22 to the side walls 13*a* and 13*b* by radiation and thermal conduction in which heat transfers in the air in the gap G2. Moreover, the gap G1 is a closed space which is demarcated by the block 24 and the cover 25 and in which the amount of air in communication with the outside is small. The gap G1 in the present embodiment is in communication with outside through only the opening 23*b*. Heat release due to convection heat transfer is thereby suppressed. Although an air flow relative to the sub-carriage 21 is generated upon moving of the carriage 5, it is difficult to generate an air flow in the air layer of the gap G1, and the heater 38 and the block 24 are protected by the cover 25, thus suppressing heat release from the heater 38 and the block 24.

The block 24 and the carriage 5 are locally coupled to each other by a conductive member (not illustrated). For example, any metal is able to be adopted as the conductive member. When each of the fixing plate 11, the holder 13, the block 24, and the carriage 5 that constitute the head unit 20 has conductivity, the head unit 20 is able to be grounded to a ground on a main body side of the liquid ejecting apparatus 1 via the fixing plate 11, the holder 13, the block 24, the conductive member, and the carriage 5. Accordingly, it is possible to suppress the head unit 20 from being affected by, for example, noise generated from the liquid ejecting head 10 or an electric component of the liquid ejecting apparatus 1 and static electricity generated by the medium PA.

The contact section 29 is arranged between the block 24 and the carriage 5 in the head unit 20. Since the thermal conductivity of the contact section 29 is lower than the thermal conductivity of the block 24, it is possible to suppress heat release from the block 24 to the carriage 5 via the contact section 29 in the head unit 20. Moreover, the contact section 29 is formed so as to protrude from the base section 23 of the block 24. This makes it possible to reduce an area in which the sub-carriage 21 is in contact with the carriage 5, and it is thus possible to suitably achieve both ensuring flatness for the sub-carriage 21 to be mounted on the carriage 5 and suppressing heat release from the sub-carriage 21 to the carriage 5.

The sub-carriage 21 may include a temperature sensor for measuring temperature of the block 24. The temperature sensor is electrically coupled to the control unit 3. The control unit 3 is able to control the amount of heat generated by the heater 38 in accordance with the temperature of the block 24 detected by the temperature sensor.

Note that the embodiment described above is merely a representative form of the disclosure, and the disclosure is not limited to the embodiment described above. Various modifications and additions can be made within a range not departing from the gist of the disclosure.

Although, for example, stainless steel, titanium, or thermally conductive ceramic is exemplified as the material for the side walls 13*a* and 13*b* in the aforementioned embodiment, the material for the side walls 13*a* and 13*b* is not limited thereto and may be another material. The material for the side walls 13*a* and 13*b* may be, for example, ceramic or heat-insulating resin having a thermal conductivity of less than, for example, 10.0 W/m·K at a normal temperature.

The carriage 5 is configured to include, for example, a single sub-carriage 21 in the aforementioned embodiment but may be configured to include two or more sub-carriages 21.

The sub-carriage 21 is configured to include, for example, two liquid ejecting heads 10 in the aforementioned embodiment but may be configured to include a single liquid ejecting head 10 or three or more liquid ejecting heads 10.

The liquid ejecting head 10 is configured to include, for example, two head chips 12 in the aforementioned embodiment but may be configured to include a single head chip 12 or three or more head chips 12. The frame 22 is not limited to being arranged so as to enclose two head chips 12. The frame 22 may be arranged so as to enclose a single head chip 12 or three or more head chips 12. Note that when the liquid ejecting head 10 includes three or more head chips 12 and when the plurality of head chips 12 are arranged in a zigzag pattern in the Y-axis direction, the center portion 81 is a portion overlapping at least a portion of each of the plurality of head chips 12, the protrusion 82 is a portion overlapping the Y2 direction end of the head chip 12 positioned furthest in the Y2 direction, and the protrusion 83 is a portion overlapping the Y1 direction end of the head chip 12 positioned furthest in the Y1 direction.

Although an instance in which the gap G3 is greater than the gap G2 has been described in the aforementioned embodiment, the gap G3 of the head unit 20 is not limited to being greater than the gap G2. The gap G3 may have the same size as the gap G1 or the gap G2 or may have a smaller size than the gap G2.

Although the plurality of head chips 12 are arranged to be shifted in the Y-axis direction in the aforementioned embodiment, the plurality of head chips 12 are not limited to being arranged to be shifted in the Y-axis direction.

Although the heater 38 is arranged so as to enclose the plurality of liquid ejecting heads 10 when viewed in the Z-axis direction in the aforementioned embodiment, the heater 38 may be provided for each of the liquid ejecting heads 10. Moreover, the connector 71 is not limited to being positioned in the X2 direction with respect to the head chip 12A and may be arranged in the Y2 direction with respect to the head chip 12A, arranged between the liquid ejecting head 10A and the liquid ejecting head 10B at a position not overlapping the common portion 22C, or arranged at another position.

Although an instance in which the thermal conductivity of the cover 25 is lower than the thermal conductivity of the block 24 has been exemplified in the aforementioned embodiment, the thermal conductivity of the cover 25 may be substantially the same as the thermal conductivity of the block 24.

Although an instance in which the thermal conductivity of the block 24 is higher than the thermal conductivity of the side walls 13*a* and 13*b* has been exemplified in the aforementioned embodiment, the thermal conductivity of the block 24 may be substantially the same as the thermal conductivity of the side walls 13*a* and 13*b*.

Although the liquid ejecting apparatus 1 of a serial type in which the carriage 5 on which the liquid ejecting head 10 is mounted is reciprocated in the width direction of the medium PA has been exemplified in the aforementioned embodiment, the disclosure may be applied to a liquid ejecting apparatus of a line type including a line head in which liquid ejecting heads 10 are arrayed in a predetermined direction.

The liquid ejecting apparatus exemplified in the form described above can be adopted for various kinds of equipment, such as a facsimile apparatus and a copying machine, in addition to equipment dedicated to printing. However, the liquid ejecting apparatus is not limited to being used for printing. For example, a liquid ejecting apparatus that ejects a solution of a coloring material is used as a manufacturing apparatus that forms a color filter of a display device, such a liquid crystal display panel. Further, a liquid ejecting apparatus that ejects a solution of a conductive material is used as a manufacturing apparatus that forms a wire and an electrode of a wiring substrate. A liquid ejecting apparatus that ejects a solution of an organic substance regarding a living body is used as, for example, a manufacturing device that manufactures a biochip.

What is claimed is:

1. A liquid ejecting apparatus comprising:
- a first liquid ejecting head configured to eject a liquid to an ejection direction;
- a sub-carriage including:
  - a first member that is thermally conductive and holds the first liquid ejecting head; and
  - a heater configured to generate heat and provided in the first member; and
- a carriage that holds the sub-carriage, wherein
- the first liquid ejecting head includes a first side wall facing the first member, and
- the first member is located between the heater and the first side wall when viewed in the ejection direction.

2. The liquid ejecting apparatus according to claim 1, wherein
- the first side wall is thermally conductive and in thermal contact with the first member.

3. The liquid ejecting apparatus according to claim 1, wherein
- thermal conductivity of the first member is higher than thermal conductivity of the first side wall.

4. The liquid ejecting apparatus according to claim 1, wherein
- the first liquid ejecting head has an ejection surface in which a nozzle for ejecting the liquid is formed, and
- the heater is arranged so as to enclose the ejection surface and the first side wall of the first liquid ejecting head when viewed in the ejection direction.

5. The liquid ejecting apparatus according to claim 4, wherein
- the sub-carriage includes a second member provided so as to enclose the heater with a first gap between the second member and the heater when viewed in the ejection direction.

6. The liquid ejecting apparatus according to claim 5, wherein
- thermal conductivity of the second member is lower than thermal conductivity of the first member.

7. The liquid ejecting apparatus according to claim 5, wherein
- thermal conductivity of the first member is higher than thermal conductivity of the first side wall, and
- thermal conductivity of the second member is lower than the thermal conductivity of the first side wall.

8. The liquid ejecting apparatus according to claim 5, wherein
- the first member includes a first frame body that encloses the ejection surface and the first side wall of the first liquid ejecting head when viewed in the ejection direction,
- the heater is provided in the first frame body, and
- the second member covers an end of the first frame body in the ejection direction when viewed in a direction opposite to the ejection direction.

9. The liquid ejecting apparatus according to claim 5, wherein
- the first member includes a first frame body that encloses the ejection surface and the first side wall of the first liquid ejecting head when viewed in the ejection direction,
- the heater is provided in the first frame body, and
- the first gap is greater than a second gap between an inner peripheral surface of the first frame body and an outer peripheral surface of the first side wall when viewed in the ejection direction.

10. The liquid ejecting apparatus according to claim 9, wherein
- the first gap is equal to or more than 0.75 mm, and
- the second gap is more than 0.00 mm and equal to or less than 0.15 mm.

11. The liquid ejecting apparatus according to claim 9, wherein
- the carriage is formed of metal,
- an opening into which the sub-carriage is inserted is formed in the carriage,
- the second member is arranged between an inner peripheral surface of the opening of the carriage and the first member when viewed in the ejection direction, and
- a third gap between the inner peripheral surface of the opening of the carriage and the first member is greater than the second gap when viewed in the ejection direction.

12. The liquid ejecting apparatus according to claim 1, wherein
- the carriage is formed of metal,
- the first side wall is thermally conductive and in thermal contact with the first member,
- the first member includes a base section that holds the first liquid ejecting head,
- the sub-carriage includes a contact section that protrudes from the base section to the carriage to come into contact with the carriage, and
- thermal conductivity of the contact section is lower than thermal conductivity of the first side wall.

13. The liquid ejecting apparatus according to claim 1, wherein
- the first liquid ejecting head has an ejection surface in which a nozzle for ejecting the liquid is formed, and
- the ejection surface is located in the ejection direction with respect to an end of the sub-carriage in the ejection direction.

14. The liquid ejecting apparatus according to claim 1, further comprising
- a second liquid ejecting head having a second side wall facing the first member, wherein
- the first member of the sub-carriage holds the first liquid ejecting head and the second liquid ejecting head, and
- the heater has a planar shape enclosing both the first side wall and the second side wall.

15. The liquid ejecting apparatus according to claim 14, wherein
- the first member includes a first frame body enclosing the first side wall and a second frame body enclosing the second side wall when viewed in the ejection direction,
- the first liquid ejecting head and the second liquid ejecting head are arranged so as to be adjacent to each other, the first frame body and the second frame body have a common portion, at least a portion of which is shared, between the first liquid ejecting head and the second liquid ejecting head, and the heater is provided along an outer periphery of the first frame body and an outer periphery of the second frame body.

16. The liquid ejecting apparatus according to claim 15, wherein the sub-carriage includes a second member provided so as to enclose the heater with a first gap between the second member and the heater when viewed in the ejection direction, and the first member and the second member are fixed to each other at a portion not overlapping the common portion between the first frame body and the second frame body when viewed in the ejection direction.

17. The liquid ejecting apparatus according to claim 1, further comprising a connector electrically coupled to the heater, wherein the first liquid ejecting head includes a first head chip and a second head chip held by the first side wall, the first head chip and the second head chip are elongated in a first direction, the first head chip and the second head chip are adjacent to each other and arranged to be shifted in the first direction and a second direction, which intersects the first direction, and the connector is arranged at a position in the first direction with respect to the first head chip and in the second direction with respect to the second head chip and held by the sub-carriage.

18. The liquid ejecting apparatus according to claim 1, wherein the first side wall is made of stainless steel, titanium, or thermally conductive ceramic, and the first member of the sub-carriage includes at least one of aluminum, copper, silver, and gold.

19. The liquid ejecting apparatus according to claim 1, wherein the first member of the sub-carriage is fastened to the carriage by a screw formed of metal via a bushing formed of resin.

20. A sub-carriage configured to hold a liquid ejecting head configured to eject a liquid to an ejection direction and to be held by a carriage of a liquid ejecting apparatus, the sub-carriage comprising:

a frame body that is thermally conductive and encloses a side wall of the liquid ejecting head when viewed in the ejection direction; and a heater configured to generate heat and provided on an outer peripheral surface of the frame body.

* * * * *